(12) United States Patent
Xia et al.

(10) Patent No.: US 12,411,708 B2
(45) Date of Patent: Sep. 9, 2025

(54) GRAPH COMPUTING METHOD AND APPARATUS

(71) Applicant: HUAWEI CLOUD COMPUTING TECHNOLOGIES CO., LTD., Gui'An New District (CN)

(72) Inventors: Yinglong Xia, Shenzhen (CN); Chenyi Zhang, Hangzhou (CN); Yang Fang, Shenzhen (CN)

(73) Assignee: HUAWEI CLOUD COMPUTING TECHNOLOGIES CO., LTD., Gui'An New District (CN)

( * ) Notice: Subject to any disclaimer, the term of this patent is extended or adjusted under 35 U.S.C. 154(b) by 866 days.

(21) Appl. No.: 17/508,294

(22) Filed: Oct. 22, 2021

(65) Prior Publication Data

US 2022/0043675 A1 Feb. 10, 2022

Related U.S. Application Data

(63) Continuation of application No. PCT/CN2019/125798, filed on Dec. 17, 2019.

(30) Foreign Application Priority Data

Apr. 24, 2019 (CN) .......................... 201910335121.4

(51) Int. Cl.
G06F 9/46 (2006.01)
G06F 9/48 (2006.01)
G06F 9/50 (2006.01)

(52) U.S. Cl.
CPC .......... *G06F 9/4881* (2013.01); *G06F 9/5027* (2013.01)

(58) Field of Classification Search
CPC .............................. G06F 9/4881; G06F 9/5027
See application file for complete search history.

(56) References Cited

U.S. PATENT DOCUMENTS

2013/0246731 A1   9/2013  Lee et al.
2015/0170316 A1*  6/2015  Balmin .................. G06F 17/10
                                                       345/503

(Continued)

FOREIGN PATENT DOCUMENTS

CN    102841816 A    12/2012
CN    103532710 A    1/2014

(Continued)

OTHER PUBLICATIONS

Yucheng Low et al.,"GraphLab: A New Framework For Parallel Machine Learning",arXiv:1006.4990v1 [cs.LG] Jun. 25, 2010,total 11 pages.

(Continued)

*Primary Examiner* — Tammy E Lee
(74) *Attorney, Agent, or Firm* — Rimon PC

(57) ABSTRACT

This application discloses a graph computing method and apparatus that support concurrent graph computing using a plurality of algorithms. A plurality of subgraphs of a graph are loaded into a plurality of computing units, and the plurality of computing units executes a plurality of algorithms in parallel, so that the same graph can be shared by the plurality of algorithms, and the plurality of algorithms can be executed in parallel on the same graph. In this way, the delay caused when one algorithm needs to executed after execution of another algorithm ends is avoided. The overall efficiency of performing graph computing is improved, and the overall time of performing graph computing is reduced.

20 Claims, 16 Drawing Sheets

(56) References Cited

U.S. PATENT DOCUMENTS

| | | | |
|---|---|---|---|
| 2018/0075098 A1* | 3/2018 | Yin | G06F 16/24561 |
| 2020/0110761 A1* | 4/2020 | Cooper | G06F 16/28 |

FOREIGN PATENT DOCUMENTS

| | | |
|---|---|---|
| CN | 103793442 A | 5/2014 |
| CN | 104780213 A | 7/2015 |
| CN | 105653204 A | 6/2016 |
| CN | 106445688 A | 2/2017 |

OTHER PUBLICATIONS

Joseph E. Gonzalez et al.,"GraphX: Graph Processing in a Distributed Dataflow Framework",OSDI"14: Proceedings of the 11th USENIX conference on Operating Systems Design and ImplementationOct. 2014,total 15 pages.

Aapo Kyrola et al.,"GraphChi: Large-Scale Graph Computation on Just a PC",10th USENIX Symposium on Operating Systems Design and Implementation (OSDI 12) Oct. 2012,total 16 pages.

Anonymous: "Graph Engine Service User Guide",May 25, 2018 (May 25, 2018), XP055913187,total 64 pages.

Vukotic Aleksa et al: "Neo4j in action",Jan. 1, 2015 (Jan. 1, 2015), XP055913222,total 305 pages.

Rong Chen et al, "Powerlyra: Differentiated Graph Computation and Partitioning on Skewed Graphs", THE 2014 Ottawa Linux Symposium (Ols '14), Jan. 22, 2019 (Jan. 22, 2019), XP093290797, total 39 pages.

Joseph E. Gonzalez et al, "PowerGraph: Distributed Graph-Parallel Computation on Natural Graphs", URL:https://www.usenix.org/system/files/conference/osdi12/osdi12-final-167.pdf, Jan. 1, 2012 (Jan. 1, 2012 ), XP093290703, total 14 pages.

Li-Yung Ho et al, "Data Replication for Distributed Graph Processing", 2013 IEEE Sixth International Conference on Cloud Computing, Jun. 28, 2013 (Jun. 28, 2013), XP032525361, total 8 pages.

Michael M. Lee et al, "Views and Transactional Storage for Large Graphs", SAT 2015 18th International Conference, Austin, TX, USA, Sep. 24-27, 2015; [Lecture Notes in Computer Science; Lect.Notes Computer], Springer, Berlin, Heidelberg, ISBN: 978-3-540-7 4549-5, Dec. 9, 2013 (Dec. 9, 2013), XP047215129, total 20 pages.

Julian Shun et al, "Ligra: A Lightweight Graph Processing Framework for Shared Memory", Proceedings of the 18th ACM SIGPLAN symposium on Principles and practice of parallel programming, Feb. 23, 2013, URL:https://dl.acm.org/doi/pdf/10.1145/2442516.2442530 , XP093290463, total 12 pages.

Lifeng Nai et al, "Exploring big graph computing—An empirical study from architectural perspective", Journal of Parallel and Distributed Computing Elsevier Amsterdam NL vol. 108, Aug. 16, 2016 (Aug. 16, 2016), XP085065756, total 16 pages.

Nam Ma et al, "Data Parallel Implementation of Belief Propagation in Factor Graphs on Multi-core Platforms", International Journal of Parallel Programming Plenum Press, New York, US, vol. 42, No. 1, Apr. 24, 2013 (Apr. 24, 2013), XP035367690, total 19 pages.

Jian Kang et al, "AURORA: Auditing PageRank on Large Graphs", 2018 IEEE International Conference On Big Data (Big Data), IEEE, DOI: 10.1109/BIGDATA.2018.8622563 , Dec. 10, 2018 (Dec. 10, 2018), XP033508529, total 10 pages.

Li Zhou et al, "C-Graph: A Highly Efficient Concurrent Graph Reachability Query Framework", Machine Learning and Machine Intelligence ACM 2 Penn Plaza, Suite 701 New YorkNY 10121-0701 USA, Aug. 13, 2018 (Aug. 13, 2018), DOI: 10.1145/3225058.3225136, XP059109178, total 10 pages.

Yinglong Xia et al, "Towards Balance-Affinity Tradeoff in Concurrent Subgraph Traversals", 2015 IEEE 29th International Parallel and Distributed Processing Symposium, DOI: 10.1109/IPDPS.2015.25, XP033177653, total 10 pages.

Ilie Tanase et al, "A Highly Efficient Runtime and Graph Libraryfor Large Scale Graph Analytics", Proceedings of Workshop on GRAph Data management Experiences and Systems, GRADES' 14, URL:https://event.cwi.nl/grades2014/10-xia.pdf, Jun. 22, 2014(Jun. 22, 2014), XP055977413, total 6 pages.

Guohao Dai et al, "FPGP: Graph Processing Framework on FPGA A Case Study of Breadth-First Search", Proceedings of the 2016 ACM/SIGDA International Symposium on Field-Programmable Gate Arrays, FPGA '16, Feb. 21, 2016 (Feb. 21, 2016), URL:https://dl.acm.org/doi/pdf/10.1145/2847263.2847339, XP093290451, total 6 pages.

Fan Wenfei et al, "GRAPE : parallelizing sequential graph computations", Proceedings of the VLDB Endowment, vol. 10, No. 12, Aug. 1, 2017 (Aug. 1, 2017), URL:https://www.pure.ed.ac.uk/ws/portalfiles/portal/42164359/ p1889_fan.pdf, XP093290454, total 5 pages.

\* cited by examiner

GRAPH COMPUTING METHOD AND APPARATUS

CROSS-REFERENCE TO RELATED APPLICATIONS

This application is a continuation of International Application No. PCT/CN2019/125798, filed on Dec. 17, 2019, which claims priority to Chinese Patent Application No. 201910335121.4, filed on Apr. 24, 2019, the disclosure of which is hereby incorporated by reference in its entirety.

TECHNICAL FIELD

This application relates to the field of computer technologies, and in particular, to a graph computing method and apparatus.

BACKGROUND

A graph is a basic data structure that includes a series of nodes and edges connected to the nodes. Many entities in life and relationships between the entities can be intuitively expressed by vertex and edges on the graph. Therefore, a graph-based analysis technology, namely, a graph computing technology emerges. The graph computing technology can be used to model, as graphs, various actual application scenarios such as a social network, a call network, a bipartite graph between a user and a product, a cooperative relationship network between authors of an essay, an index relationship between articles, a financial transaction network, interaction between a radio base station in a region and servers in a cloud, and a data exchange relationship between mobile game users. A graph is computed to unearth a rule implied in the entities represented by the graph.

With the popularization of the graph computing technology, a large quantity of users often need to compute graphs at the same time. Different users need to compute graphs by using the same algorithm or different algorithms. Therefore, a computing device receives a batch of computing requests, and each computing request is used to request to compute a graph by using one or more algorithms. The computing device sequentially computes the graph by using each algorithm in a serial manner based on the computing request. Specifically, it is assumed that a computing request is to request to compute a graph by using N algorithms, and in this case, the computing device first loads the graph from an external memory into a memory, computes the graph by using an algorithm 1, and then releases the graph from the memory after the execution of the algorithm 1 completes and its computing result is obtained; similarly, the computing device loads the graph from the external memory into the memory again, computes the graph by using an algorithm 2, and then releases the graph from the memory after the execution of the algorithm 2 completes and its computing result is obtained; and the like. After the execution of each algorithm sequentially, the computing results of N algorithms may be obtained, where N is a positive integer.

It can be learned from the foregoing example that, when a serial method is used to compute the graph, only after the execution of one algorithm, the next algorithm can be executed. Consequently, computing efficiency is low.

SUMMARY

This application provides a graph computing method and apparatus, to improve computing efficiency of graph computing.

A first aspect of this application provides a graph computing method. The method may be performed by more than one graph computing apparatus. For example, the graph computing apparatus may be a plurality of computing units in a distributed cloud environment. The method includes:
  receiving at least one computing request, where the at least one computing request is used to request to compute a graph by using a plurality of algorithms;
  loading a plurality of subgraphs of the graph into a plurality of computing units; and
  executing the plurality of algorithms in parallel by using the plurality of computing units.

A method that can support concurrent graph computing by using a plurality of algorithms is provided above. The plurality of subgraphs of the graph are loaded into the plurality of computing units, and the plurality of computing units executes a plurality of algorithms in parallel, so that the same graph can be shared by the plurality of algorithms, and the plurality of algorithms are executed in parallel. In this way, the delay caused by one algorithm needing to wait to be executed after the execution of another algorithm is saved, so that the overall efficiency of performing graph computing by using the plurality of algorithms is improved, and the overall time of performing graph computing by using the plurality of algorithms is shortened.

In addition, the same graph is shared by the plurality of algorithms, so that a graph that has been loaded into a memory may be reused when graph computing is performed by using the plurality of algorithms, and the steps of loading the graph into the memory and releasing the graph from the memory do not need to be separately performed for each algorithm. In this way, overheads caused by repeatedly loading the same graph into the memory and releasing the graph from the memory are avoided, the number of times for accessing the memory is reduced, and the input/output (I/O) bottleneck is eliminated.

In a possible implementation, the executing the plurality of algorithms in parallel by using the plurality of computing units includes:
  obtaining at least one task in each algorithm; and
  executing tasks in the plurality of algorithms in parallel by using the plurality of computing units.

In a possible implementation, the obtaining at least one task in each algorithm includes at least one of the following:
  classifying at least one step corresponding to the same function name in the algorithm into one task based on the function name corresponding to each step in the algorithm;
  dividing the algorithm into a gather task, an apply task, and a scatter task based on a gather apply scatter (GAS) model;
  dividing the algorithm into a local task, a communication task, and a synchronization task based on a bulk synchronous parallel (BSP) model;
  classifying the steps of the same execution body in the algorithm into one task based on the execution body of each step in the algorithm;
  classifying the steps with the same access sequence in the algorithm into one task based on the access sequence for vertices or edges on the graph in each step in the algorithm;
  classifying the steps, in the algorithm, in which the same vertex or the same edge is accessed into one task based on the vertices or the edges accessed in each step in the algorithm;
  classifying each step in the algorithm into one task;

classifying the steps of the same action in the algorithm into one task based on the actions executed in each step in the algorithm;

classifying the steps that belong to the same iteration process in the algorithm into one task based on the iteration process to which each step in the algorithm belongs; and classifying the steps that belong to the same determining branch in the algorithm into one task based on the determining branch to which each step in the algorithm belongs.

In the method provided above, the algorithm is decomposed into tasks. For different algorithms used for processing the same graph, tasks that have the same data access manner can be gathered together, so that the gap between the different algorithms is eliminated, and the similarity in data access modes of the tasks can be exposed. In this way, the tasks are properly scheduled and assigned based on that tasks of the same type access a graph in similar manners, so that system resources are properly used and scheduled to provide a service with higher overall performance. In particular, during multi-user multi-algorithm concurrent executions, decomposing the plurality of algorithms into tasks facilitates unified management on the plurality of algorithms.

In a possible implementation, the loading a plurality of subgraphs of the graph into a plurality of computing units includes:

loading the plurality of subgraphs in at least one modality into the plurality of computing units; and the executing tasks in the plurality of algorithms in parallel by using the plurality of computing units includes:

for any task in the plurality of algorithms, executing the task based on a subgraph in a target modality by using the plurality of computing units, where the target modality is a modality that is in the at least one modality and that matches the task.

In a possible implementation, the task includes a step of performing searching from a first vertex on the graph to a second vertex on the graph, and the second vertex is arranged in front of the first vertex on the subgraph in the target modality.

In the method provided above, the affinity between different types of tasks and subgraphs in different modalities is considered, multi-modality management of the graph is implemented, and task assignment can be associated with a subgraph modality, so that a task is assigned to a computing unit into which the proper subgraph is loaded. A relatively optimized data structure may be provided for the task, to alleviate the problem of limited data locality that is common in the graph computing field, so that the execution speed of computing tasks is improved. Specifically, because pre-order information of each vertex needs to be accessed in the gather task, and in a subgraph in an incoming edge modality, pre-order information of all vertices happen to be aggregated together, data locality can be improved. Similarly, for the scatter task, if information needs to be provided for all subsequent nodes in the scatter task, the scatter task is assigned to a computing unit into which an outgoing edge modality is loaded, and the computing unit processes the scatter task, so that data locality and computing efficiency can be improved.

In a possible implementation, the executing tasks in the plurality of algorithms in parallel by using the plurality of computing units includes:

obtaining priorities of the plurality of algorithms based on the quantities of iterations of the plurality of algorithms;

obtaining a scheduling scheme based on the priority of each algorithm, where the scheduling scheme is used to indicate a correspondence between at least one target task and at least one target subgraph, the target task is a task that is currently scheduled in the tasks in the plurality of algorithms, and the target subgraph is a subgraph that is currently scheduled in the plurality of subgraphs; and executing the at least one target task in parallel by using the plurality of computing units into which the at least one target subgraph is loaded.

In a possible implementation, the executing tasks in the plurality of algorithms in parallel by using the plurality of computing units includes:

obtaining priorities of the plurality of algorithms according to a configuration indication, where the configuration indication is used to indicate the priorities of the plurality of algorithms;

obtaining a scheduling scheme based on the priority of each algorithm, where the scheduling scheme is used to indicate a correspondence between at least one target task and at least one target subgraph, the target task is a task that is currently scheduled in the tasks in the plurality of algorithms, and the target subgraph is a subgraph that is currently scheduled in the plurality of subgraphs; and executing the at least one target task in parallel by using the plurality of computing units into which the at least one target subgraph is loaded.

The method provided above can ensure that the manner of defining the priorities of the algorithms can be customized by a user to meet a user requirement. In other words, a system can implement scheduling based on different scheduling targets, so that the system has a good configurability.

In a possible implementation, the executing the plurality of algorithms in parallel by using the plurality of computing units includes at least one of the following:

for any algorithm in the plurality of algorithms, performing the steps other than a loading step in the algorithm, where the loading step is a step of loading the graph into a memory of the computing unit; and for any algorithm in the plurality of algorithms, performing the steps other than a releasing step in the algorithm, where the releasing step is a step of releasing the graph from the memory of the computing unit.

In the method provided above, for the same subgraph, in a process of executing a plurality of algorithms on the subgraph, a releasing step in one or more algorithms is deleted, so that a process of releasing the subgraph from the memory of the computing unit during execution of the one or more algorithms can be avoided, and time overheads and performance overheads caused by repeatedly releasing the same subgraph can be avoided.

In a possible implementation, before the receiving at least one computing request, the method further includes:

dividing the graph to obtain the plurality of subgraphs; and saving the plurality of subgraphs to a graph storage apparatus; and the loading a plurality of subgraphs of the graph into a plurality of computing units includes:

loading the plurality of subgraphs of the graph from the graph storage apparatus into the plurality of computing units.

In the method provided above, the graph is divided into the plurality of subgraphs in advance, and the plurality of subgraphs are stored. If the computing request is received, the plurality of subgraphs may be directly loaded into the plurality of computing units without a need to temporarily divide the graph into subgraphs. In this way, a delay caused by temporarily dividing the graph into subgraphs is saved, the execution speed of the plurality of algorithms can be increased, the efficiency of executing the plurality of algorithms is improved, and fast processing of the computing request is facilitated.

In a possible implementation, the dividing the graph includes:
dividing the graph based on the quantity of the plurality of computing units.

According to the method provided, evenly loading the subgraphs into the plurality of computing units can be supported, to be specific, when the plurality of subgraphs of the graph are loaded into the computing units, the quantities of subgraphs loaded into different computing units are the same or approximately the same, so that load balancing among different computing units is ensured when each computing unit executes algorithms based on the loaded subgraphs.

In a possible implementation, the method further includes:
sending a capacity expansion request, where the capacity expansion request is used to request to expand capacities of the plurality of computing units;
receiving a capacity expansion indication, where the capacity expansion indication is used to indicate to expand the capacities of the plurality of computing units;
creating at least one computing unit;
copying at least one subgraph of the graph to obtain an instance of the at least one subgraph;
loading the instance of the at least one subgraph into the created at least one computing unit; and
executing the plurality of algorithms in parallel by using the created at least one computing unit.

In a possible implementation, the capacity expansion request includes at least one of the quantity of to-be-added computing units and capacity expansion fees.

In the method provided above, dynamic capacity expansion may be automatically performed in a process of executing the plurality of algorithms in parallel on the graph. More computing units are created to execute the algorithms, so that the overall computing capability of a system can be improved, and the delay of executing the plurality of algorithms can be shortened. In addition, a quantity of tasks that need to be loaded during execution of the algorithm is offloaded to an added computing unit, so that load balancing of the system can be implemented. In particular, in a scenario in which the plurality of computing units leased by the user are not enough to support parallel execution of the plurality of algorithms, the capacity expansion request is automatically triggered to indicate to the user to lease more computing units to execute the algorithms, so that the adaptive capability of the system can be improved.

In a possible implementation, the copying at least one subgraph of the graph includes:
counting the quantity of times that each subgraph of the graph is requested by the plurality of algorithms; and
copying a subgraph of the graph whose quantity of times of being requested reaches a threshold.

In the method provided above, in consideration of a fact that the quantity of accesses that can be supported by a single graph has a physical upper limit, if the quantity of accesses of the graph exceeds the physical upper limit, it is likely that parallel execution of the plurality of algorithms on the graph cannot be supported, and consequently a bottleneck is created to the execution process of the algorithm on the graph. For example, if a subgraph is a hotspot subgraph, for example, the subgraph is a subgraph that includes celebrity information, it is likely that a large quantity of users access the subgraph at the same moment to query the celebrity information, and in this case, the subgraph may not support simultaneous scheduling by a plurality of tasks, and the algorithms cannot be executed in parallel, and this limits an overall speed of graph computing. In the foregoing implementation, the graph computing apparatus can monitor the quantity of times that each subgraph is requested. If the quantity of times that a specific subgraph is requested exceeds a threshold, it indicates that there are quite large requirements for the subgraph, and the subgraph is very likely to be a hotspot subgraph. In this case, the subgraph is triggered to be copied into a plurality of copies, and the plurality of copies are separately deployed on different computing units, and the subgraph is processed by the plurality of computing units, so that processing efficiency of the subgraph can be improved. In other words, concurrency is linearly expanded by offloading concurrent computing requests to different instances for computing.

A second aspect of this application provides a graph computing apparatus. The apparatus is configured to perform the method provided in the first aspect or any possible implementation of the first aspect. Specifically, the graph computing apparatus includes units configured to perform the method provided in the first aspect or any possible implementation of the first aspect.

A third aspect of this application provides a graph computing apparatus, including a plurality of computing units, where each computing unit includes a processor and a memory, the memory stores at least one instruction, and the instruction is loaded and executed by the processor to implement the method provided in the first aspect or any possible implementation of the first aspect.

A fourth aspect of this application provides a graph computing system, including a graph computing apparatus and a graph storage apparatus.

The graph computing apparatus includes a plurality of computing units.

The graph storage apparatus is configured to store a plurality of subgraphs of a graph.

The graph computing apparatus is configured to load the plurality of subgraphs from the graph storage apparatus into the plurality of computing units, to perform the method provided in the first aspect or any possible implementation of the first aspect.

A fifth aspect of this application provides a non-transitory readable storage medium. When the non-transitory readable storage medium is executed by a graph computing apparatus, the graph computing apparatus performs the method provided in the first aspect or any possible implementation of the first aspect. The storage medium stores a program. A type of the storage medium includes but is not limited to a volatile memory such as a random access memory and a non-volatile memory such as a flash memory, a hard disk drive (HDD), or a solid state drive (SSD).

A sixth aspect of this application provides a computer program product. When the computer program product is executed by a graph computing apparatus, the graph computing apparatus performs the method provided in the first aspect or any possible implementation of the first aspect.

The computer program product may be a software installation package, and when the method provided in the first aspect or any possible implementation of the first aspect needs to be used, the computer program product may be downloaded and executed on the graph computing apparatus.

BRIEF DESCRIPTION OF DRAWINGS

To describe the technical solutions in embodiments of this application more clearly, the following briefly describes the accompanying drawings required for the embodiments.

DESCRIPTION OF EMBODIMENTS

Figure 1:
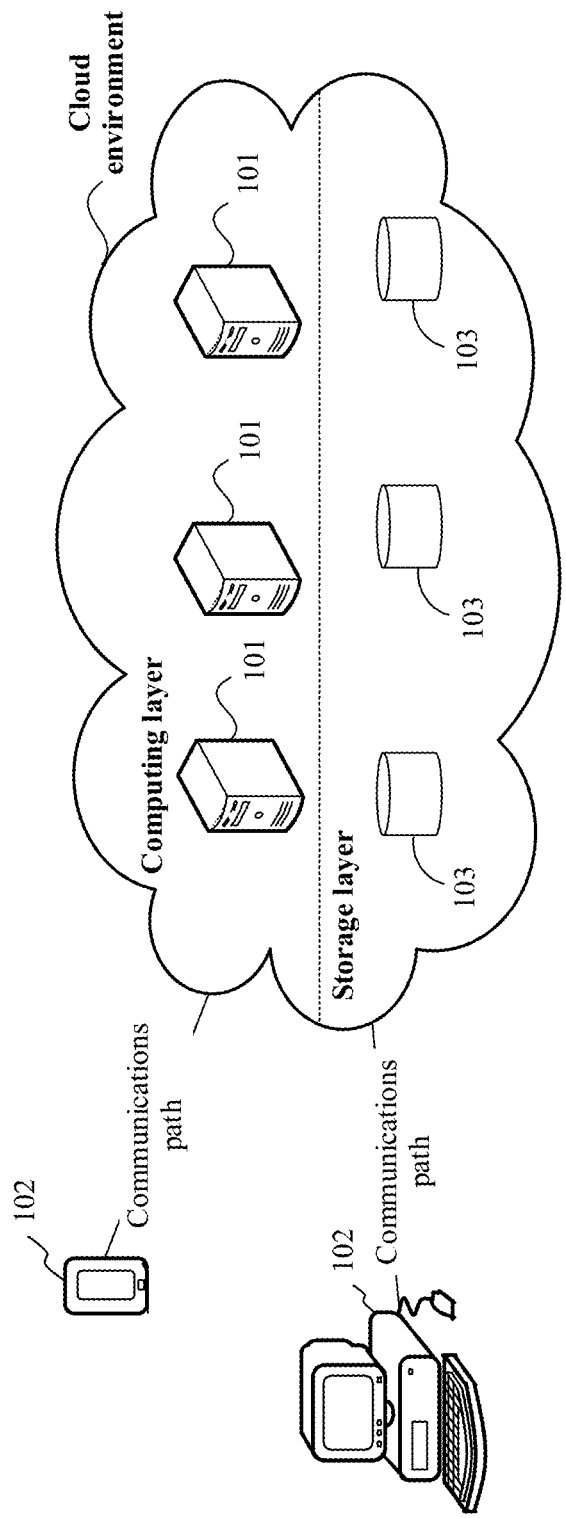
FIG. 1 is an architectural diagram of a graph computing system according to an embodiment of this application.

The following describes the technical solutions in embodiments of this application with reference to the accompanying drawings in the embodiments of this application.

The term "unit" in this application may be implemented by hardware, or may be implemented by executing corresponding software by hardware. The hardware or the software has a function of performing corresponding steps in the following method. For example, a receiving unit may be rearranged with a transceiver to perform a receiving step in the following method, and a computing unit may be rearranged with a processor and a memory to perform an execution step in the following method.

The term "module" in this application may be a software module.

In this application, the words "first" and "second" are used to distinguish between same or similar terms whose effects and functions are basically the same. It should be understood that there is no logical or temporal dependency relationship among "first", "second", and "$n^{th}$", and a quantity and an execution sequence are not limited.

Concepts used in this application are described below.

A graph is a data structure that includes at least one vertex and at least one edge. In some scenarios, the vertex on the graph may be mapped to an entity, and the edge on the graph may be mapped to a relationship between entities. The graph may be a directed graph or an undirected graph. Certainly, the graph may further include other data other than the vertex and the edge, such as a label of the vertex and a label of the edge. In an example scenario, in a friend recommendation scenario, each vertex on the graph may represent one user, each edge on the graph may represent a social relationship between different users, and data of each vertex on the graph is portrait data of the user and behavior data of the user, for example, an age, a career, a hobby, and an education background of the user. For another example, in a commodity recommendation scenario, each vertex on the graph may represent one user or one commodity, and each edge on the graph may represent an interaction relationship between the user and the commodity, such as a purchase relationship or a collection relationship. For another example, in a financial risk control scenario, each vertex on the graph may represent an account, a transaction, or funds. The edge on the graph may represent a flow relationship of funds, for example, a loop on the graph may represent circular transfer. For another example, in an enterprise network optimization scenario, each vertex on the graph may represent one network element such as a router, a switch, or a terminal, and each edge on the graph may represent a connection relationship between different network elements.

An algorithm includes a series of operations performed on the vertex and/or the edge on the graph to perform an operation such as statistics collection, ranking, or path selection on the vertex and/or the edge on the graph. For example, the algorithm may be a web page ranking algorithm, a Pixie random walk algorithm, a breadth-first search (BFS) algorithm, a depth-first search algorithm, a personalized web page ranking algorithm (also referred to as a personal rank algorithm), a k-core algorithm, a k-hop algorithm, a shortest path algorithm, an all shortest path algorithm, an associated path algorithm, a compact centrality algorithm, a label propagation algorithm, a modularity-based community discovery algorithm (Louvain algorithm), an association prediction algorithm, a node2vec algorithm (an algorithm for mapping a node in a network to Euclidean space), a real-time recommendation algorithm, a common neighbor algorithm, a single-source shortest path algorithm, a connected component algorithm, a triangular counting algorithm, or a clustering coefficient algorithm.

A subgraph is a part of a graph, and includes some vertices and some edges on the graph. The subgraph may also be referred to as a partition on the graph. One graph may include a plurality of subgraphs.

A gather apply scatter (GAS) model is a programming specification for an algorithm. Based on the GAS model, the algorithm may be divided into three tasks: a gather task, an apply task, and a scatter task.

The gather task may include a step of obtaining data from the neighboring vertices of a vertex on the graph and a step of obtaining data of an edge on the graph. The gather task may be considered as a process in which a working vertex gathers data from its neighboring vertices and itself. For example, the gather task may be to sum up data on all the edges on the graph. For another example, the gather task may be to compute the quantity of the neighboring vertices of a vertex. In a process of executing the gather task, the vertices and the edges may be in a read-only state.

The apply task may include a step of updating data of the vertices on the graph and a step of synchronizing the data of a vertex on the graph to its mirror vertex. For example, the apply task may be that each computing vertex computes the quantity of the neighboring vertices of the same vertex. The apply task may be that a mirror vertex sends a computing result of the gather task to the primary vertex, and the primary vertex summarizes the computing results of a plurality of mirror vertices, performs further computing based on a service requirement by using a summarized result and vertex data in a previous step, and then updates data of the primary vertex and synchronizes the data to the mirror vertices. In a process of executing the apply task, the working vertex may be in a modifiable state, and the edge may be in an unmodifiable state.

The scatter task may include a step of sending data to the neighboring vertices of a vertex on the graph and a step of updating data on the edges on the graph. For example, the scatter task may be a process in which the working vertex updates the data on the edge after updating the data on the vertex, and notifies a neighboring vertex in a dependency relationship with the working vertex to update a state. In a process of executing the scatter task, the working vertex may be in a read-only state, and the edge may be in a writable state.

A bulk synchronous parallel (BSP) model is a programming specification for an algorithm. Based on the BSP model, the algorithm may be divided into three tasks: a local task, a communication task, and a synchronization task.

The local task is also referred to as a local computation task, and may include a step, in the algorithm, of performing computing based on data at a local end. For example, the local task may include a computing process that needs to be completed by a single processing unit.

The communication task may include a step that is in the algorithm and that requires interaction between different computing units. For example, the communication task may include a step that is in the algorithm and in which a processing unit A sends a computing result of a subgraph to a processing unit B.

The synchronization task may include a step, in the algorithm, of waiting for the communication task to complete, for example, the synchronization task may include a barrier synchronization process.

A modality is a form of data, or an expression manner of data. For the same piece of data, different modalities of the data are different in terms of forms, but same substantive information is included in the data. In the embodiments of this application, the subgraph may have at least one modality. For example, for a subgraph, a vertex included in the subgraph in a modality 1 is the same as a vertex included in the subgraph in a modality 2, an edge included in the subgraph in the modality 1 is the same as an edge included in the subgraph in the modality 2, and an arrangement sequence of vertices included on the subgraph in the modality 1 may be different from an arrangement sequence of vertices included on the subgraph in the modality 2. For example, if the subgraph includes a vertex 1, a vertex 2, . . . , and a vertex 100, the subgraph in the modality 1 and the subgraph in the modality 2 each include the vertex 1, the vertex 2, . . . , and the vertex 100, the vertex 1 on the subgraph in the modality 1 is arranged in front of the vertex 2, and the vertex 1 on the subgraph in the modality 2 is arranged behind the vertex 2.

An incoming edge modality is a modality of a subgraph constructed based on an incoming edge. The incoming edge modality is used to indicate an incoming edge relationship between different vertices on the subgraph. Specifically, an end vertex of each edge on the subgraph may be arranged in front of a start vertex of each edge. For example, if the subgraph includes a vertex A, a vertex B, and a vertex C, and a relationship between the three vertices is as follows: there is an edge between the vertex A and the vertex B, a direction of the edge is from the vertex A to the vertex B, there is another edge between the vertex A and the vertex C, and a direction of the edge is from the vertex A to the vertex C, the vertex A on the subgraph in the incoming edge modality may be arranged in front of the vertex B and the vertex C.

An outgoing edge modality is a modality of a subgraph constructed based on an outgoing edge, and a subgraph in the outgoing edge modality may include at least one outgoing edge. Specifically, a start vertex of each edge on the subgraph may be arranged in front of an end vertex of each edge. For example, if the subgraph includes a vertex A, a vertex B, and a vertex C, and a relationship between the three vertices is as follows: there is an edge between the vertex A and the vertex B, a direction of the edge is from the vertex A to the vertex B, there is another edge between the vertex A and the vertex C, and a direction of the edge is from the vertex A to the vertex C, the vertex B and the vertex C on the subgraph in the outgoing edge modality may be arranged in front of the vertex A.

A system architecture of this application is described as an example below.

FIG. 1 is an architectural diagram of a graph computing system according to an embodiment of this application. The graph computing system includes a graph computing apparatus 101 and a terminal 102. The terminal 102 is configured to send a computing request to the graph computing apparatus 101. The graph computing apparatus 101 is configured to: receive the computing request of the terminal 102, perform a graph computing method provided in the following method embodiment, and send a computing result to the terminal 102.

As shown in FIG. 1, the graph computing apparatus 101 may include one or more computing units, and different computing units may perform the same step or different steps in the following method embodiment. In some possible embodiments, the computing unit may be a physical device. For example, the computing unit may be a physical server or a central processing unit (CPU). In some other possible embodiments, the computing unit may be a virtualized device. For example, the computing unit may be a virtual machine, a container, a pod (the pod is a basic running unit of the container during running, management, and orchestration of a container application in Kubernetes), or a core of a processor. In some other possible embodiments, the computing unit may be a basic unit in software. For example, the computing unit may be an application, a service, a microservice, a module, a sub-module, a class, or a function. Specifications of one or more computing units in the graph computing apparatus 101 may be the same. For example, the one or more computing units may include the same quantity of processors and memories of the same capacity. Certainly, the specifications of the one or more computing units may alternatively be different. This is not limited in this embodiment.

A plurality of computing units may be implemented by using a single machine, or may form a distributed system. In some possible embodiments, the plurality of computing units may run on the same physical device, and different computing units may communicate with each other by using a communications network inside the physical device. For example, the plurality of computing units may be a plurality of virtual machines or a plurality of containers on one physical server. For another example, the plurality of computing units may be a plurality of cores in the same processor or in a plurality of processors in the same physical server that communicate with each other by using a bus. In some other possible embodiments, different computing units on the graph computing apparatus 101 may run on different physical devices, for example, may run at different locations, at different computing centers, in different equipment rooms, and on different racks. Different physical devices on the graph computing apparatus 101 may interact with each other by using a network.

In some possible embodiments, the graph computing apparatus 101 may be provided for a user as a cloud computing service, for example, may be provided for the user as a graph engine service (GES). The graph computing apparatus 101 may run in a cloud environment, for example, may run in a public cloud, a private cloud, or a hybrid cloud. For example, the graph computing apparatus 101 may be an elastic cloud server (ECS) cluster, and each computing unit on the graph computing apparatus 101 is one ECS. For another example, the graph computing apparatus 101 may be a virtual machine cluster, and each computing unit on the graph computing apparatus 101 is one virtual machine running in the cloud environment. For another example, the graph computing apparatus 101 may be provided as a cloud container engine (CCE), and each computing unit on the graph computing apparatus 101 is one container running in the cloud environment. For another example, the graph computing apparatus 101 may be provided as a cloud service platform, and each computing unit on the graph computing apparatus 101 is an application, a service, or a microservice running in the cloud environment.

It should be understood that, that the graph computing apparatus 101 runs in the cloud environment is merely an example. The graph computing apparatus 101 may alternatively run in an edge environment, and each computing unit in the graph computing apparatus 101 may be an edge computing device in the edge environment. Alternatively, the graph computing apparatus 101 may run in the edge environment, and each computing unit in the computing apparatus 101 may be a terminal device in a terminal environment. In this embodiment, a running environment of the graph computing apparatus 101 is not limited. In addition, each computing unit on the graph computing apparatus 101 may alternatively run in a different environment. For example, the graph computing apparatus 101 may run some computing units on the graph computing apparatus 101 in all or any two of the cloud environment, the edge environment, and the terminal environment.

The terminal 102 may be a mobile phone, a notebook computer, a server, a desktop computer, or the like. The terminal 102 may interact with the graph computing apparatus 101 by using a network.

In some possible embodiments, the graph computing system may further include a graph storage apparatus 103. The graph storage apparatus 103 is configured to provide a graph storage service for the graph computing apparatus 101. The graph storage apparatus 103 may be implemented by using a single machine, or may form a distributed system. For example, the graph storage apparatus 103 may be a distributed memory.

The graph storage apparatus 103 may be implemented by using a cloud storage service. The graph storage apparatus 103 may run in the cloud environment, for example, may run in a public cloud, a private cloud, or a hybrid cloud. For example, the graph storage apparatus 103 may be an object storage service (OBS), a cloud disk, or a cloud database.

The graph computing system shown in FIG. 1 may be provided as a big data engine, and the graph computing apparatus 101 and the graph storage apparatus 103 may be provided as different layers of the big data engine that are obtained through division based on logical functions. For example, the graph computing apparatus 101 may be provided as a computing layer, and the graph storage apparatus 103 may be provided as a storage layer.

It should be noted that, the foregoing is merely described by using an example in which the graph computing apparatus 101 and the graph storage apparatus 103 are two separate apparatuses. In some possible embodiments, the graph computing apparatus 101 and the graph storage apparatus 103 may be integrated, in other words, the graph computing apparatus 101 may have both a graph computing function and a graph storage function.

An application scenario of this application is described as an example below.

The graph computing method provided in this embodiment of this application may be applied to various online and/or offline platforms related to graph computing, graph analysis, graph query, and the like, or may be encapsulated into various different applications. Processing logic provided in the following method embodiment may be used as a graph computing function built in a platform or an application, so that the platform and/or the application may play a role in many fields such as public security, financial risk control, anti-fraud, social media, root cause analysis, digital asset management, and data source tracing.

In particular, on a cloud platform, as graph analysis is increasingly popularized, there are increasingly abundant algorithms for graph analysis. In addition, a data scale of a graph is also increasing constantly. On the cloud platform, usually a plurality of or even a plurality of groups of users/tenants use the platform at the same time, and graphs for different groups of users are different. A large quantity of users often need to use a plurality of analysis algorithms to perform computing on massive graphs. For example, terminals of a plurality of users of the same tenant may concurrently request to compute the same graph by using different algorithms. For another example, different tenants may request, by using terminals, to compute different graphs by using the same algorithm. However, by implementing the method provided in this application, the cloud platform may support concurrent execution of a plurality of algorithms on the same graph. In one aspect, the computing efficiency and computing speed of the cloud platform can be improved through concurrent execution of different algorithms, so that performance of the cloud platform is improved. In another aspect, different algorithms may share the same graph, so that the quantity of times of loading the graph does not increase with the quantity of algorithms, and input/output (I/O) bottleneck is eliminated.

In an example scenario, data analysis and insights may be performed in an enterprise of a social media type. In this scenario, a terminal of the enterprise may send a social network graph to the graph computing apparatus, and the graph computing apparatus saves the social network graph to the graph storage apparatus. The terminal may send a computing request to the graph computing apparatus, where the computing request is used to request to compute the social network graph by using a web page ranking algorithm (referred to as an algorithm P for short below) and a width-first traversal algorithm (referred to as an algorithm B for short below). After receiving the computing request, the graph computing apparatus may load the social network graph from the graph storage apparatus into a plurality of computing units. The plurality of computing units may execute the algorithm P and the algorithm B in parallel on the social network graph to obtain a result of the algorithm P and a result of the algorithm B, and return the result of the algorithm P and the result of the algorithm B to the terminal of the enterprise. The result of the algorithm P is a score of each vertex on the social network graph, the score is a floating vertex number from 0 to 1, and the score indicates importance of the vertex computed based on a structure of the social network graph. The result of the algorithm B is a tree originating from a given root node R, where the tree is formed as follows: a pre-order vertex is found for each vertex on the social network graph from the root node R, and all reachable vertices are associated.

A logical function architecture of the graph computing apparatus provided in this application is described as an example below.

Figure 2:
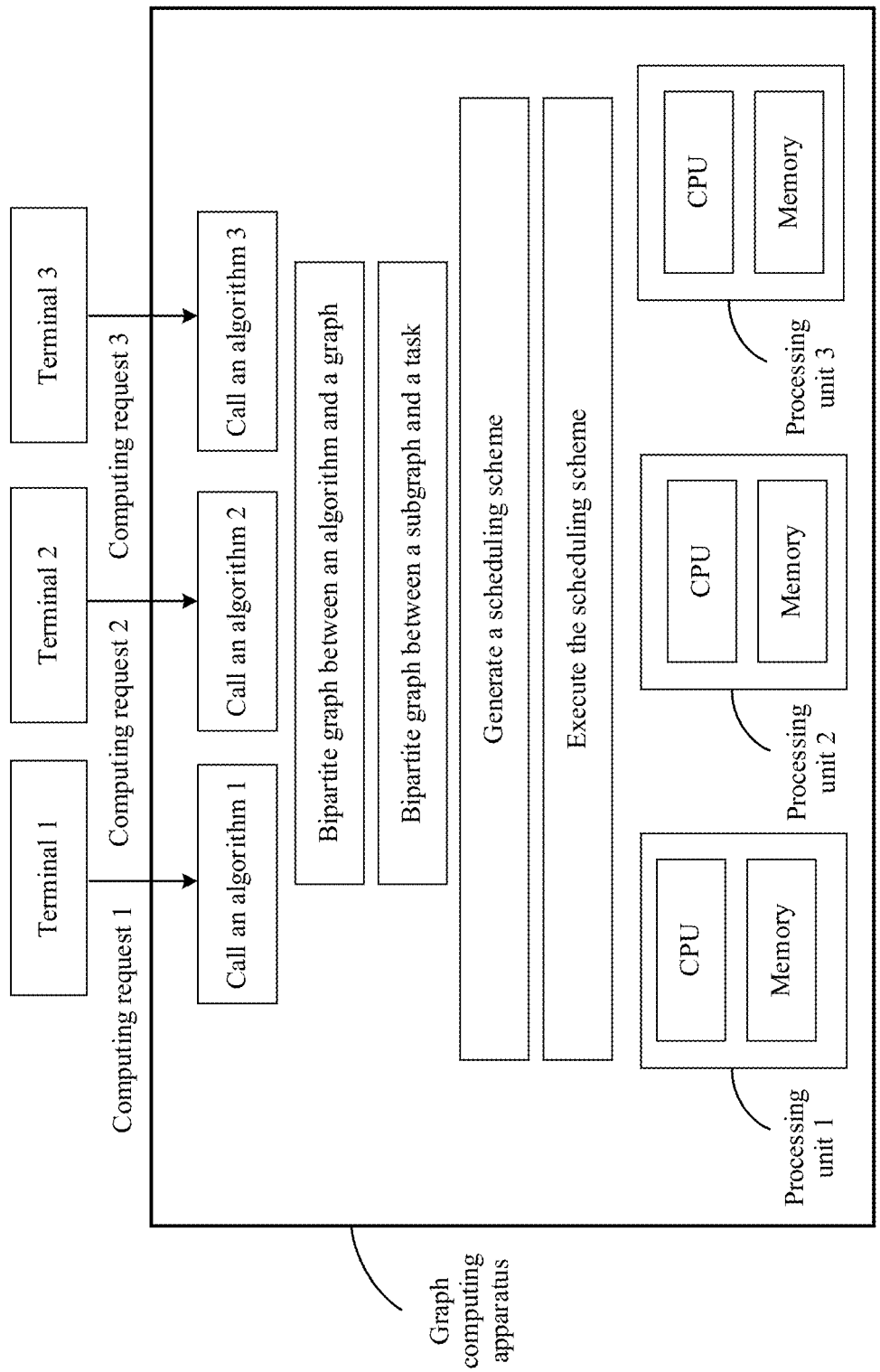
FIG. 2 is a diagram of functional architecture of a graph computing apparatus according to an embodiment of this application.

As shown in FIG. 2, in a sequence from top to bottom in FIG. 2, if a terminal 1, a terminal 2, and a terminal 3 simultaneously send a computing request 1, a computing request 2, and a computing request 3 to a graph computing apparatus, the computing request 1, the computing request 2, and the computing request 3 respectively indicate to compute the same graph by using an algorithm 1, an algorithm 2, and an algorithm 3.

After receiving the computing request 1, the computing request 2, and the computing request 3, the graph computing apparatus may call the algorithm 1, the algorithm 2, and the algorithm 3 to load a plurality of subgraphs of the graph into memories of a processing unit 1, a processing unit 2, and a processing unit 3, to generate a bipartite graph between an algorithm and a graph, and generate a bipartite graph between a subgraph and a task based on the bipartite graph.

A scheduling scheme between a subgraph and a task is generated based on the bipartite graph, and the processing unit 1, the processing unit 2, and the processing unit 3 execute tasks in the algorithm 1, the algorithm 2, and the algorithm 3 based on the scheduling scheme, to execute the scheduling scheme.

A working procedure of the graph computing apparatus according to this application is described as an example below.

Figure 3:
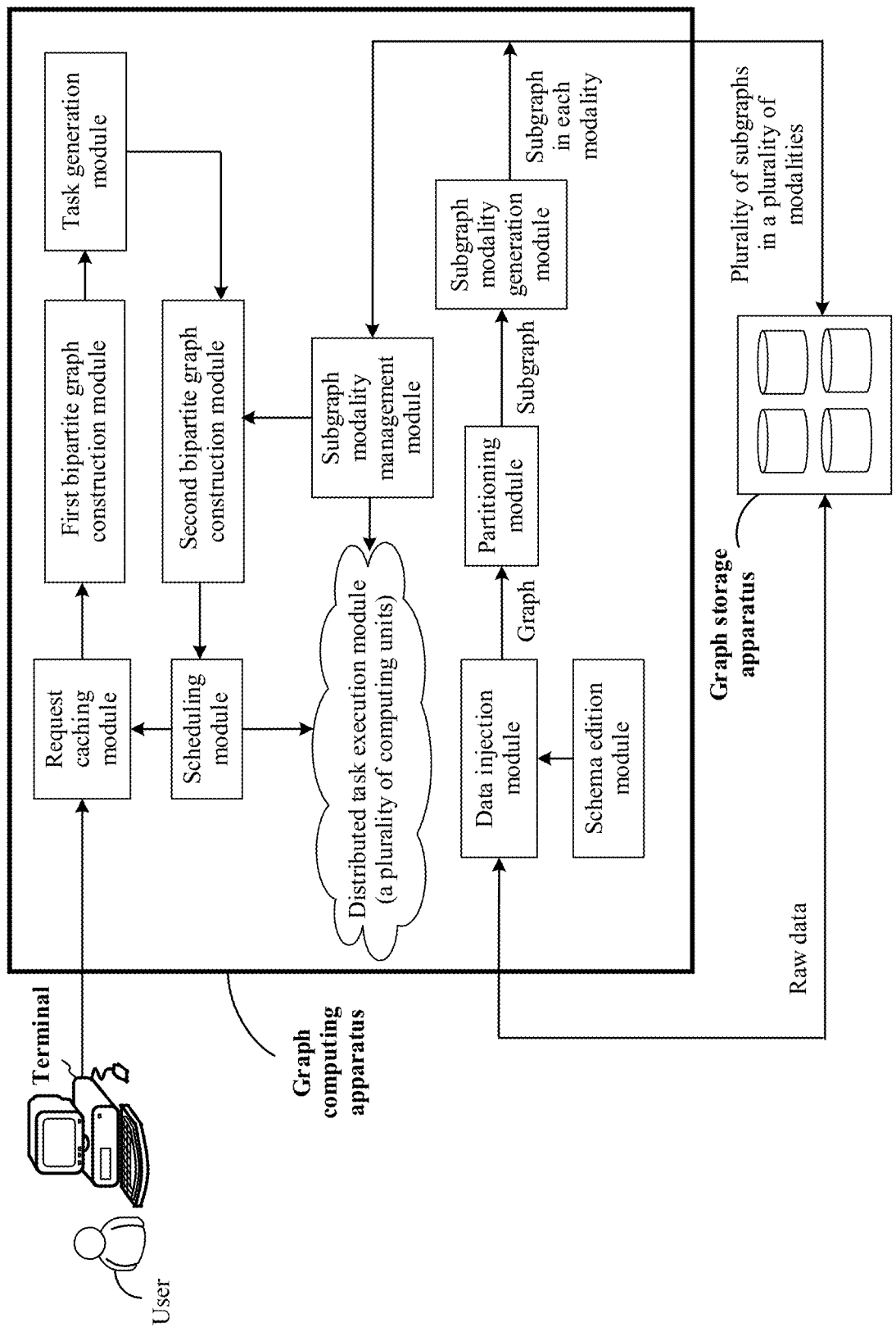
FIG. 3 is a diagram of a working procedure of a graph computing apparatus according to an embodiment of this application.

FIG. 3 is a diagram of a working procedure of a graph computing apparatus according to this application. The graph computing apparatus shown in FIG. 3 includes a request caching module, a scheduling module, a distributed task execution module, a first bipartite graph construction module, a second bipartite graph construction module, a task generation module, a subgraph modality management module, a data injection module, a schema edition module, a partitioning module, and a subgraph modality generation module.

The module in FIG. 3 may be configured to perform the steps involved in FIG. 2. For example, the first bipartite graph construction module may be configured to perform the step of generating the bipartite graph between an algorithm and a graph in FIG. 2; the second bipartite graph construction module may be configured to perform the step of generating the bipartite graph between a subgraph and a task in FIG. 2; the scheduling module may be configured to perform the step of generating the scheduling scheme in FIG. 2; and the distributed task execution module may be the processing unit 1, the processing unit 2, and the processing unit 3 in FIG. 2, and the distributed task execution module may be configured to perform the step of executing the scheduling scheme in FIG. 2.

It can be seen from a left side of FIG. 3 that the graph computing apparatus may have two inputs and one output. One input is raw data, the raw data is used to construct a graph, and the raw data is injected into the graph computing apparatus via the data injection module. In a data injection process, the schema edition module obtains the raw data from the data injection module, and constructs the graph by using the raw data based on schema information input by a terminal. For example, the schema edition module may construct, based on a large amount of user data, a graph representing a social network. The partitioning module is configured to partition the constructed graph, and each partition forms one subgraph. Then, subgraphs in one or more modalities are generated for each subgraph by using the subgraph modality generation module, the subgraph modality management module may manage a subgraph in each modality, and in addition, each subgraph in each modality may be permanently stored in a graph storage apparatus. The subgraph is called for subsequent graph computing.

The schema information is used to indicate a manner of constructing semantics of the graph, in other words, a method for defining data items of a vertex and an edge on the graph. The schema information may include a vertex declaration, an edge declaration, a format attribute, a schema declaration, and the like.

The other input to the graph computing apparatus is a computing request triggered by a single user or a group of users. The computing request is also referred to as a query, and the computing request indicates the graph and a to-be-executed algorithm, for example, the computing request indicates a name of the algorithm and a name of the graph. The computing request is input to the request caching module, and the request caching module caches the computing request for batch processing. Based on the algorithm and the graph that are indicated by the computing request, the first bipartite graph construction module may generate a first bipartite graph, that is, a bipartite graph between an algorithm and a task, and on the first bipartite graph, the task generation module decomposes an algorithm into a series of tasks based on a programming model based on which the algorithm is implemented, for example, generates a gather task, an apply task, and a scatter task based on a GAS model. The generated task may be associated with a subgraph in a matched modality by using the subgraph modality management module, to generate a second bipartite graph, that is, a bipartite graph between a task and a subgraph. The scheduling module may schedule, based on the second bipartite graph, the distributed task execution module to execute the task. Considering that some algorithms are iterative algorithms, and new tasks are dynamically generated with continuous iteration, an arrow of an output of the scheduling module vertex to the request caching module, to dynamically add a new iterative task to the request caching module. The distributed task execution module is configured to execute a plurality of algorithms. In addition, the distributed task execution module may monitor tasks in the iterative algorithms, store and accumulate intermediate results of the tasks, and output a final result to a user after iteration of the iterative algorithms is terminated.

The output of the graph computing apparatus is computing results of a plurality of algorithms, and may be fed back to the user.

Figure 4:
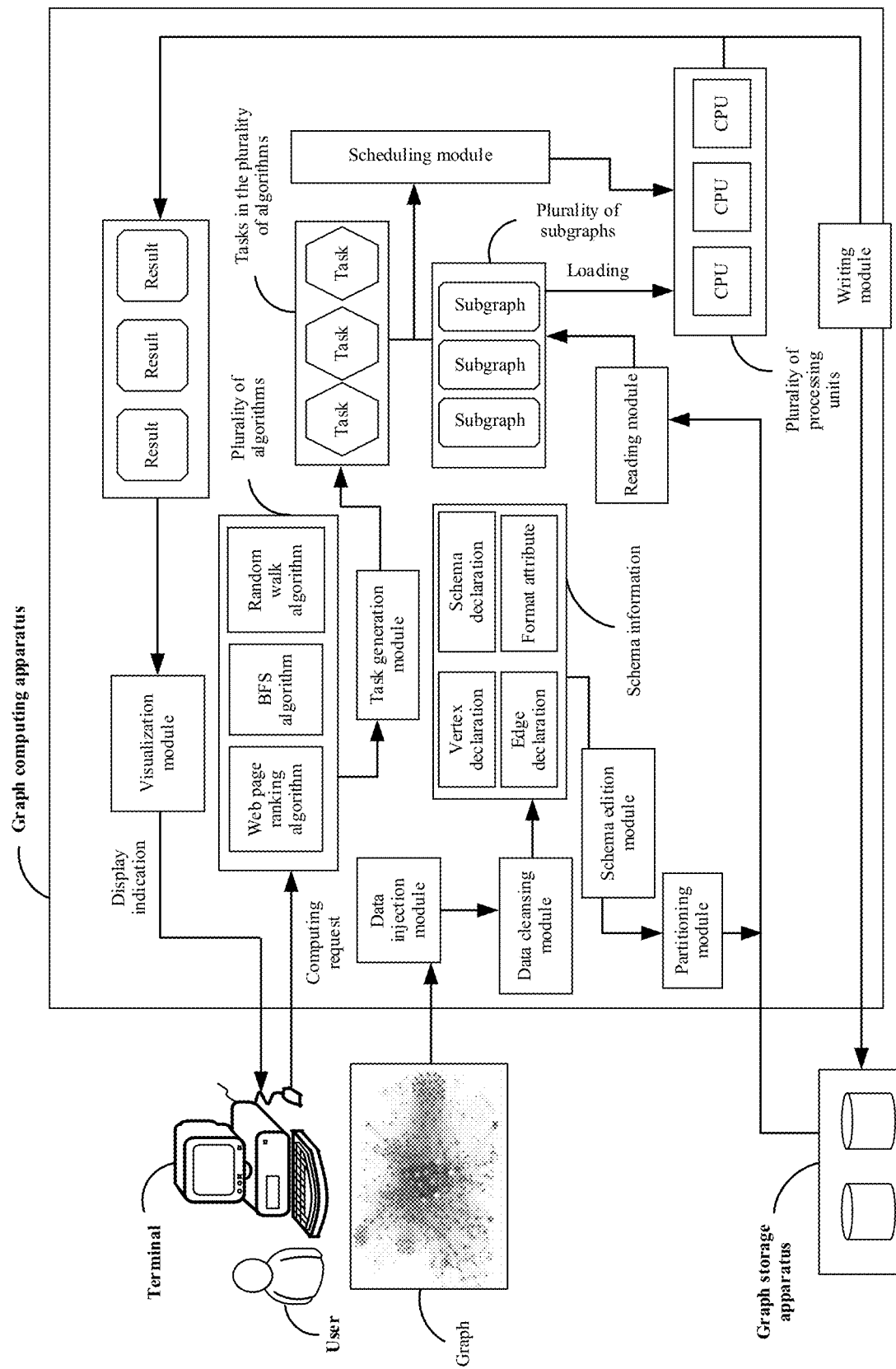
FIG. 4 is a diagram of another working procedure of a graph computing apparatus according to an embodiment of this application.

Based on FIG. 3, FIG. 4 shows a specific instance of FIG. 3. FIG. 4 shows a process in which a graph computing apparatus computes a graph by using a web page ranking algorithm, a BFS algorithm, and a random walk algorithm. Different from FIG. 3, the graph computing apparatus provided in FIG. 4 includes not only the modules in FIG. 3, but also a data cleansing module, a reading module, a writing module, a visualization module, a reading module, and a scheduling module. For modules and working procedures shared by FIG. 4 and FIG. 3, refer to the foregoing descriptions of FIG. 3. The following describes modules and working procedures that are specific to FIG. 4 relative to FIG. 3.

The data cleansing module is configured to cleanse the raw data in the data injection module, for example, filter out noise data. Data output by the data cleansing module may be constructed as a graph by using the schema edition module. The reading module is configured to read a plurality of subgraphs of the graph from the graph storage apparatus in a graph computing process. The writing module is configured to write the plurality of subgraphs of the graph into the graph storage apparatus. The visualization module is configured to visualize a computing result of the computing unit, for example, generate a user interface (UI) display indication. The UI display indication is used to indicate the terminal to display a user interface including the computing result, and the UI display indication may be sent to the terminal. The scheduling module is configured to perform scheduling based on tasks in a plurality of algorithms and a plurality of subgraphs, to execute the tasks by using the computing unit.

Figure 5:
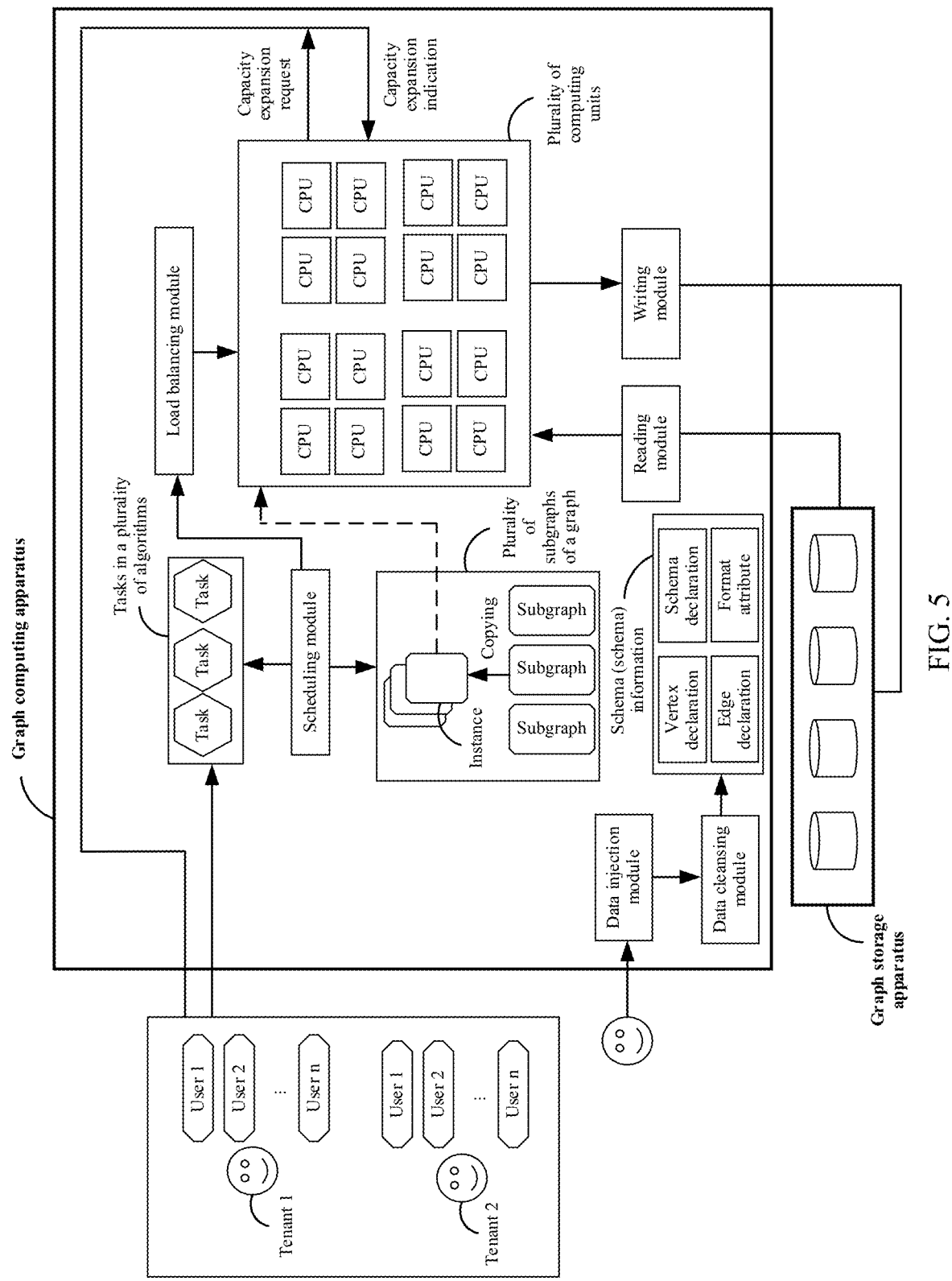
FIG. 5 is a diagram of another working procedure of a graph computing apparatus according to an embodiment of this application.

Based on FIG. 3 and FIG. 4, FIG. 5 is another diagram of a working procedure of a graph computing apparatus according to this application. Different from FIG. 4 in which a procedure of performing parallel computing on a single graph by using a plurality of algorithms is shown, FIG. 5 shows a procedure of performing parallel computing on a plurality of graphs by using a plurality of algorithms. In addition, a difference from FIG. 3 and FIG. 4 lies in that the graph computing apparatus provided in FIG. 5 not only includes the modules in FIG. 3 and FIG. 4, but FIG. 5 also includes a load balancing module. For modules and working procedures shared by FIG. 5 with FIG. 3 and FIG. 4, refer to the foregoing descriptions of FIG. 3 and FIG. 4. The following describes modules and working procedures that are specific to FIG. 5 relative to FIG. 3 and FIG. 4.

The load balancing module is configured to perform load balancing on a plurality of computing units. Specifically, as shown in FIG. 5, a user 1, a user 2, . . . , and a user n corresponding to a tenant 1 and a user 1, a user 2, . . . , and a user n corresponding to a tenant 2 may simultaneously trigger computing requests by using respective terminals. The graph computing apparatus may simultaneously receive requests of terminals of two groups of users corresponding to two tenants, where n is a positive integer. In this scenario, the load balancing module shown in FIG. 5 may determine, based on CPU usages, idle memories, or other information of the plurality of computing units, that computing capabilities of the plurality of computing units may be insufficient to support processing of tasks generated by a large quantity of computing requests. Therefore, the load balancing module may send a capacity expansion request to the terminal. After receiving the capacity expansion request, the terminal returns a capacity expansion indication. After expanding a capacity of the computing unit, the load balancing module may copy the subgraph into a plurality of instances, and load the instances into an added computing unit, so that the added computing unit shares a task load.

Figure 6:
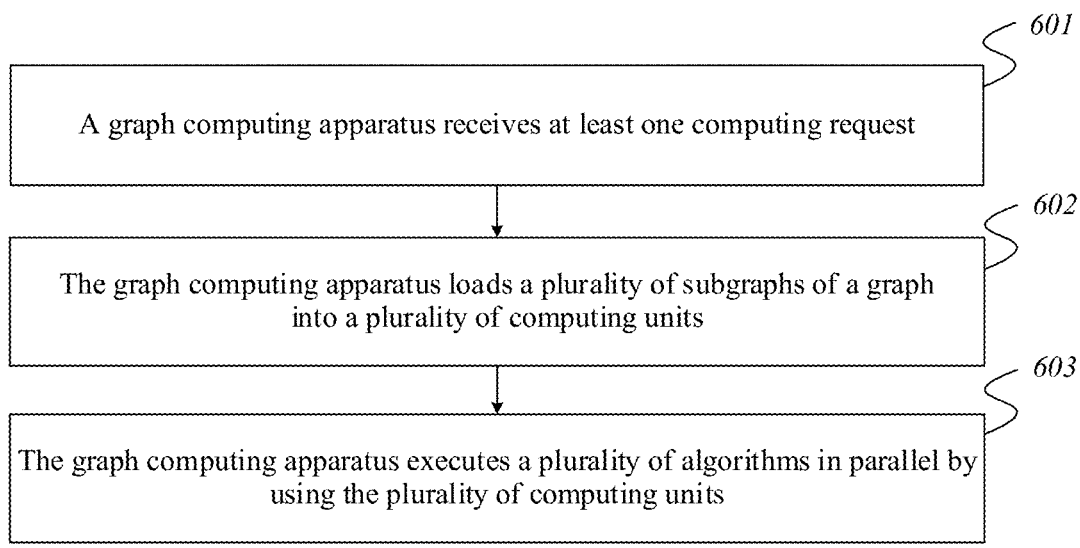
FIG. 6 is a schematic flowchart of a method according to this application.

As shown in FIG. 6, a procedure of a graph computing method is described, and the method includes steps 601 to 603 performed by a graph computing apparatus.

Step 601: The graph computing apparatus receives at least one computing request.

The at least one computing request is used to request to compute a graph by using a plurality of algorithms. Specifically, each computing request may be used to request to compute the graph by using one or more algorithms. In some possible embodiments, the computing request may include an identifier of the algorithm and an identifier of the graph. The identifier of the algorithm is used to indicate the corresponding algorithm, for example, may be a name, an identity (ID), or a sequence number of the algorithm. The identifier of the graph is used to indicate the corresponding graph, for example, may be an ID, a name, or a sequence number of the algorithm. In addition, the computing request may further include a user identifier, and the user identifier is used to indicate a corresponding user, for example, may be an ID or a name of the user.

In some possible embodiments, one or more terminals may generate one or more computing requests, and send the one or more computing requests to the graph computing apparatus, and the graph computing apparatus may receive at least one computing request of the one or more terminals. For example, the terminal may run in a terminal environment, the graph computing apparatus may run in a cloud environment, and the terminal and the graph computing apparatus may exchange the computing request by using respective public internet protocol addresses (IP address).

Graphs requested by computing requests of different terminals may be the same or different, and algorithms requested by computing requests of different terminals may be the same or different. For example, in a single-graph multi-algorithm scenario shown in FIG. 4, a plurality of users may request, at the same moment, to compute the same graph by using different algorithms, and terminals of the plurality of users may concurrently send computing requests to the graph computing apparatus. The graph computing apparatus may simultaneously receive computing requests of a plurality of terminals, and execute a plurality of algorithms in parallel on the same graph by performing the following step 602 and step 603, to process the computing requests of the plurality of terminals. For another example, in a multi-graph multi-algorithm scenario shown in FIG. 5, a plurality of users of a plurality of tenants may request, at the same moment, to compute the same graph or different graphs by using different algorithms, and terminals of the plurality of users of the plurality of tenants may concurrently send computing requests to the graph computing apparatus. The graph computing apparatus may simultaneously receive computing requests of a plurality of terminals, and execute a plurality of corresponding algorithms in parallel on each of the plurality of graphs by performing the following step 602 and step 603, to process the computing requests of the plurality of terminals.

It should be noted that, the graph computing apparatus may be a computing unit cluster, and step 601 may be performed by one or more computing units in the computing unit cluster. In some possible embodiments, the computing unit cluster may include one or more control plane computing units, and the one or more control plane computing units are configured to receive at least one computing request. For example, the control plane computing unit may be a primary node, a client node, or the like in the computing unit cluster. In some other possible embodiments, each computing unit in the computing unit cluster may receive at least one computing request.

Step 602: The graph computing apparatus loads a plurality of subgraphs of a graph into a plurality of computing units.

The graph computing apparatus may obtain an identifier of the graph from the computing request, determine the plurality of subgraphs of the graph based on the graph corresponding to the identifier of the graph, and load the plurality of subgraphs into memories of the plurality of computing units. After the loading is completed, a memory of each computing unit caches the plurality of subgraphs.

The graph computing apparatus may load all or some subgraphs of the graph into the computing unit. Specifically, if the graph includes N subgraphs in total, for each computing unit, the graph computing apparatus may load all the N subgraphs into the computing unit. In addition, the graph computing apparatus may alternatively load M subgraphs into the computing unit. N and M are positive integers, and M is less than N.

In some possible embodiments, the graph computing apparatus may determine a storage capacity of the computing unit. If the storage capacity of the computing unit is sufficient, for example, the storage capacity is greater than a preset threshold, the graph computing apparatus may load all the subgraphs into the computing unit. If the storage capacity of the computing unit is insufficient, for example, the storage capacity is less than the preset threshold, the graph computing apparatus may load some subgraphs into the computing unit.

For example, the graph computing apparatus may adopt an even loading manner, may obtain a ratio of the total quantity of subgraphs to the total quantity of computing units, and may use the ratio as the quantity of subgraphs to be loaded into each computing unit, and load the quantity of subgraphs into each computing unit. In this way, the quantities of subgraphs loaded into different computing units may be equal or approximately equal. For example, if the graph includes N subgraphs, and there are M computing units, N/M subgraphs may be loaded into each computing unit, where/represents division.

In some possible embodiments, the plurality of subgraphs of the graph may be pre-stored on a graph storage apparatus, and the graph computing apparatus may load the plurality of subgraphs from the graph storage apparatus into the plurality of computing units. For example, the graph computing apparatus may divide the graph into the plurality of subgraphs in advance, save the plurality of subgraphs to the graph storage apparatus, generate a correspondence between an identifier of the graph and storage locations of the plurality of subgraphs on the graph storage apparatus based on the storage locations of the plurality of subgraphs, and store the correspondence. When at least one computing request is received, the storage locations of the plurality of subgraphs may be queried from the correspondence based on the identifier of the graph, the plurality of subgraphs are read from the storage locations on the graph storage apparatus, and the plurality of subgraphs are loaded from the graph storage apparatus into the plurality of computing units.

The graph computing apparatus may divide the graph into the plurality of subgraphs in advance, and save the plurality of subgraphs obtained through division to the graph storage apparatus. For example, the graph storage apparatus may store a database for storing the subgraph of the graph, and when obtaining the subgraphs through division, the graph computing apparatus may save the subgraphs to the database, and if the computing request is received, the graph computing apparatus reads the plurality of subgraphs of the graph from the database.

The graph is divided into the plurality of subgraphs in advance, and the plurality of subgraphs are stored. If the computing request is received, the plurality of subgraphs may be directly loaded into the plurality of computing units without a need to temporarily divide the graph into subgraphs. In this way, a delay caused by temporarily dividing the graph into subgraphs is saved, an execution speed of the plurality of algorithms can be increased, efficiency of executing the plurality of algorithms is improved, and fast processing of the computing request of the terminal is facilitated.

Certainly, dividing the graph into subgraphs in advance is merely an example. In some other possible embodiments, if the graph computing apparatus receives a computing request, the graph computing apparatus may determine a graph indicated by the computing request, and divide the graph to obtain a plurality of subgraphs.

Optionally, if the graph computing apparatus receives the computing request, the graph computing apparatus may query whether the graph storage apparatus stores the subgraph of the graph, and if the graph storage apparatus stores a plurality of subgraphs of the graph, the graph storage apparatus loads the plurality of subgraphs into the computing unit; if the graph storage apparatus does not store the plurality of subgraphs of the graph, the graph storage apparatus divides the graph indicated by the computing request into a plurality of subgraphs, and loads the plurality of subgraphs into the computing unit, and in addition, may save the plurality of subgraphs to the graph storage apparatus, so that when a computing request for the graph is received next time, a subgraph is loaded from the graph storage apparatus.

In this implementation, as the quantity of to-be-computed graphs increases, the graph computing apparatus may save a subgraph of a new graph to the graph storage apparatus for a plurality of times, to increase a data amount of the subgraphs on the graph storage apparatus, so that the subgraph of the graph can be dynamically maintained.

In some other possible embodiments, the graph computing apparatus may divide the graph into the plurality of subgraphs after receiving the computing request. An occasion for dividing the graph into subgraphs is not limited in this embodiment.

In a process of dividing the graph into subgraphs, the graph computing apparatus may partition the graph, and each partition forms one subgraph. In some possible embodiments, the graph computing apparatus may divide the graph based on the quantity of the plurality of computing units. For example, the graph computing apparatus may divide the graph into subgraphs whose quantity is an integer multiple of the quantity of computing units. For example, if the total quantity of the plurality of computing units is K, the graph computing apparatus may divide the graph into subgraphs whose quantity is a multiple of K, where K is a positive integer.

In this implementation, evenly loading the subgraphs into the plurality of computing units can be supported, so that it is ensured that when the subgraphs are loaded into the computing units, quantities of subgraphs loaded into different computing units are the same or approximately the same. For example, if the user leases five virtual machines, the graph may be divided into 10 subgraphs, and if the computing request is received, two subgraphs may be loaded into each virtual machine.

For example, the total quantity of subgraphs obtained through division may be determined based on at least one of a size of the graph and capabilities of the plurality of computing units. The total quantity of subgraphs obtained through division may be positively correlated with the size of the graph. A larger size of the graph leads to a larger total quantity of subgraphs. The total quantity of subgraphs obtained through division may be negatively correlated with the capabilities of the plurality of computing units. A stronger capability of the computing unit leads to a smaller total quantity of subgraphs and a larger data amount of a single subgraph. The capability of the computing unit may include a processing capability and a storage capability of the computing unit. The processing capability may be represented by an indicator such as a primary frequency and the quantity of cores of the computing unit. The storage capability may be represented by an indicator such as a storage capacity of the computing unit.

In some possible embodiments, the total quantity of subgraphs may be used as a parameter that can be configured on the graph computing apparatus, and the parameter may be adjusted by a system profiler, or may be adjusted by analyzing historical data of the graph computing apparatus. The parameter may be used in combination with various graph partitioning algorithms.

In some other possible embodiments, the graph computing apparatus may alternatively divide the graph into the plurality of subgraphs in a manner of storing a backup of the graph. For example, if the backup is stored, the graph is divided into M data blocks, and each of the M data blocks may be used as one subgraph, where M is a positive integer.

In some possible embodiments, each subgraph of the graph may include at least one modality, and the graph computing apparatus may load a plurality of subgraphs in the at least one modality of the graph into the plurality of computing units. The graph computing apparatus may load subgraphs in all modalities of the graph into the plurality of computing units. For example, if the subgraph includes W modalities, for each computing unit, the graph computing apparatus may separately load a plurality of subgraphs in the W modalities of the graph into the computing unit, where W is a positive integer.

For example, the subgraph includes two modalities: an incoming edge modality and an outgoing edge modality. If the graph includes n subgraphs in total, the graph includes subgraphs in (2×n) different modalities in total, the subgraphs in the (2×n) different modalities are separately a subgraph 1 in the incoming edge modality, a subgraph 1 in the outgoing edge modality, a subgraph 2 in the incoming edge modality, a subgraph 2 in the outgoing edge modality, . . . , a subgraph n in the incoming edge modality, and a subgraph n in the outgoing edge modality. For any computing unit, if the graph computing apparatus is to load all subgraphs of the graph into the computing unit, the graph computing apparatus loads subgraphs in (2×n) different modalities into the computing unit; and if the graph computing apparatus is to load subgraphs of the graph into the computing units in an even loading manner, and it is assumed that there are m computing units in total, the graph computing apparatus loads subgraphs in (2×n/m) different modalities into the computing units, where n and m are positive integers, m is less than n, x represents multiplication, and/represents division.

Figure 7:
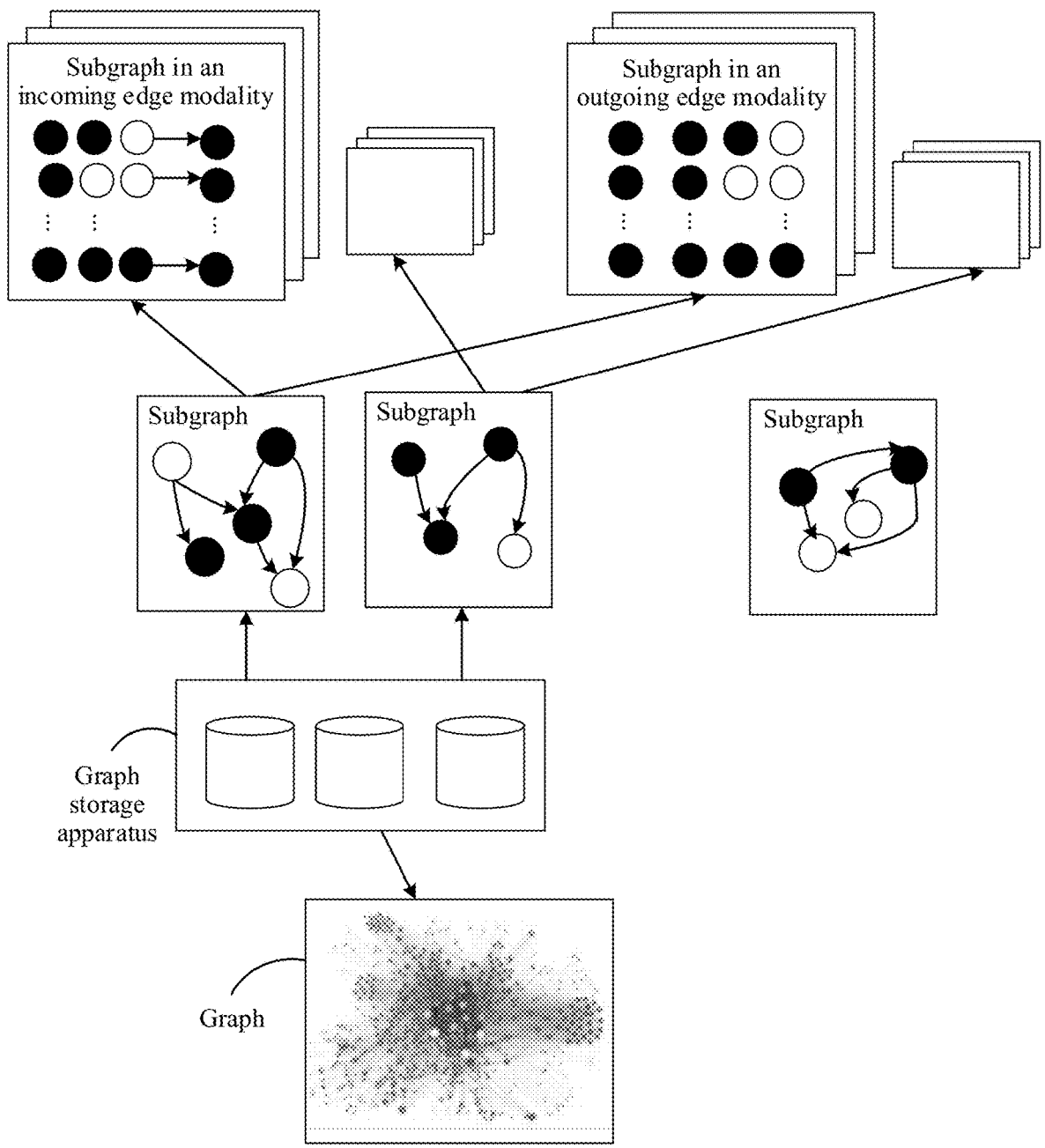
FIG. 7 is a schematic diagram of a subgraph in an incoming edge modality and a subgraph in an outgoing edge modality according to this application.

In some possible embodiments, the graph computing apparatus may divide the graph into a plurality of subgraphs in advance, generate, for each subgraph, the subgraph in at least one modality, and pre-store a plurality of subgraphs in the at least one modality on the graph storage apparatus. If a computing request is received, the graph computing apparatus may load the plurality of subgraphs in the at least one modality from the graph storage apparatus. For example, as shown in FIG. 7, for each subgraph of the graph, the graph computing apparatus may generate a subgraph in the incoming edge modality and a subgraph in the outgoing edge modality, and save the subgraphs in the two modalities to the graph storage apparatus. A solid vertex and a hollow vertex in FIG. 7 represent an ownership between different vertices on the subgraph, to distinguish between a vertex included on the subgraph and a mirror of the vertex.

In some possible embodiments, the graph computing apparatus may obtain identifiers of a plurality of algorithms from the computing request, determine the plurality of algorithms based on the algorithms corresponding to the identifiers of the algorithms, and call the plurality of algorithms. A process of calling the plurality of algorithms and step 602 may be sequentially performed. For example, the plurality of algorithms may be called first, and then step 602 is performed; or step 602 may be performed first, and then the plurality of algorithms are called. Certainly, the process of calling the plurality of algorithms and step 602 may alternatively be performed in parallel. A sequence of the process of calling the plurality of algorithms and step 602 is not limited in this embodiment.

In an example scenario, in a cloud computing field, the graph computing apparatus may load a plurality of subgraphs into all computing units leased by the user. In addition, the graph computing apparatus may alternatively select some computing units from all computing units leased by the user, and load a plurality of subgraphs into the some computing units.

After receiving the computing request, the graph computing apparatus may temporarily create at least one computing unit in a cluster, and load a plurality of subgraphs into the created at least one computing unit. In addition, alternatively, when receiving the computing request, the graph computing apparatus may power on a plurality of computing units in a dormant state in a cluster, and load a plurality of subgraphs into the plurality of powered-on computing units. In addition, alternatively, when receiving the computing request, the graph computing apparatus may determine a plurality of computing units in a running state in the cluster, and load a plurality of subgraphs into the plurality of computing units. A specific implementation used during implementation of this embodiment is not limited.

It should be noted that an execution entity of step 602 may be the plurality of computing units into which subgraphs are to be loaded, in other words, step 602 may include: loading a plurality of subgraphs of the graph into the plurality of computing units. The execution entity of step 602 may alternatively be a computing unit, in the computing apparatus, other than the computing unit into which the subgraph is to be loaded. For example, the graph computing apparatus may be a computing unit cluster, and the computing unit cluster includes a control plane computing unit and a data plane computing unit. The control plane computing unit may load a plurality of subgraphs into the data plane computing units. For example, the control plane computing unit may generate a control indication, and send the control indication to the data plane computing unit. The control indication is used to indicate to load a plurality of graphs. The data plane computing unit may receive the control indication, and load the plurality of subgraphs of the graph. The data plane computing unit may be a secondary node in the computing unit cluster. For example, the control plane computing unit in the graph computing apparatus may obtain a user identifier from the computing request, query a data plane computing unit leased by using the user identifier, and load a plurality of subgraphs into the data plane computing unit.

Step 603: The graph computing apparatus executes the plurality of algorithms in parallel by using the plurality of computing units.

The plurality of computing units may execute the plurality of algorithms in parallel based on at least one loaded subgraph, in other words, the plurality of computing units may simultaneously execute the plurality of algorithms on the at least one subgraph. When the plurality of computing units executes the plurality of algorithms, the same subgraph may be reused. Specifically, if inputs of any two or more algorithms are the same subgraph, the computing units may simultaneously execute the two or more algorithms based on the subgraph. For example, if a subgraph 1 needs to be computed in each of an algorithm 1, an algorithm 2, and an algorithm 3, the plurality of computing units may execute the algorithm 1, the algorithm 2, and the algorithm 3 in parallel based on the subgraph 1.

Effects achieved by executing the plurality of algorithms in parallel on at least one subgraph include but are not limited to the following two aspects:

In one aspect, for any subgraph, when an algorithm is executed based on the subgraph, another algorithm may be executed at the same time, so that the delay caused by the algorithm needing to wait for the execution of the another algorithm to complete is avoided, the overall time of graph computing performed by using the plurality of algorithms is shortened, and the overall efficiency of graph computing performed by using the plurality of algorithms is improved. For example, when the algorithm 1 is executed based on the subgraph 1, the algorithm 2 and the algorithm 2 may be executed at the same time, so that the delay caused, during execution of the algorithm 2, by waiting for the execution of the algorithm 1 to complete is avoided, and the delay caused, during execution of the algorithm 3, by waiting for the execution of the algorithm 2 to complete is also avoided.

In another aspect, the same graph is shared by the plurality of algorithms, so that a graph that has been loaded into a memory may be reused when graph computing is performed by using the plurality of algorithms, and steps of loading the graph into the memory and releasing the graph from the memory do not need to be separately performed for each algorithm. In this way, overheads caused by repeatedly loading the same graph into the memory and releasing the graph from the memory are avoided, time for accessing the memory is reduced, and any I/O bottleneck is eliminated. For example, when the algorithm 1, the algorithm 2, and the algorithm 3 are executed based on the subgraph 1, a step of loading the subgraph 1 may be performed once for the algorithm 1, the algorithm 2, and the algorithm 3, to avoid performing a process of loading the subgraph 1 once again for the algorithm 2 when the process of loading the subgraph 1 has been performed once for the algorithm 1, and also to avoid performing the process of loading the subgraph 1 once again for the algorithm 3. In this way, a delay caused by repeatedly loading the same subgraph 1 is avoided. In addition, after the execution of the algorithm 1, the algorithm 2, and the algorithm 3 ends, the subgraph 1 may be released, to avoid performing a process of releasing the subgraph 1 once again for the algorithm 2 when the subgraph 1 has been released once for the algorithm 1, and also to avoid performing the process of releasing the subgraph 1 once again for the algorithm 3. In this way, a delay caused by repeatedly releasing the same subgraph 1 is avoided.

In some possible embodiments, step 603 may include the following step 1 and step 2.

Step 1: For each algorithm in the plurality of algorithms, the graph computing apparatus obtains at least one task in the algorithm.

The task is also referred to as an operator, the task is some steps in the algorithm, and each algorithm may include one or more tasks. For example, if the algorithm includes Q steps, the task may be P steps in the algorithm, where P is greater than or equal to 1 and less than or equal to Q, and P and Q are positive integers. The same algorithm may be divided into different tasks based on different functions. For example, the algorithm may include a gather task, an apply task, and a scatter task. For another example, the algorithm may include a local task, a communication task, and a synchronization task.

The graph computing apparatus may decompose the algorithm into fine-grained tasks by obtaining the at least one task in the algorithm, to manage and schedule the corresponding algorithm by managing and scheduling the tasks.

In some possible embodiments, step 1 may include any one of or a combination of a plurality of the following manner 1 to manner 9. Optionally, the graph computing apparatus may determine whether the algorithm accords with a programming model, and perform the following manner 1 if the algorithm accords with the programming model; or perform the following manner 2 to manner 9 if the algorithm does not accord with the programming model. The programming model is a specification for writing an algorithm. For example, the programming model may be a Pregel model (a vertex-centered programming model), a GAS model, or a BSP model. That the algorithm accords with the programming model means that a function name included in the algorithm is the same as a function name specified in the programming model. For example, if the algorithm accords with a GAS algorithm, the algorithm includes a function whose function name is "gather", a function whose function name is "apply", and a function whose function name is "scatter". That the algorithm does not accord with the programming model means that the function name in the algorithm is inconsistent with the function name specified in the programming model. For example, the function name included in the algorithm is a user-defined function name.

Manner 1: The graph computing apparatus classifies at least one step corresponding to the same function name in the algorithm into one task based on the function name corresponding to each step in the algorithm.

For example, the graph computing apparatus may pre-store at least one function name, or read at least one function name from the algorithm, and the graph computing apparatus may classify at least one step corresponding to the same function name into one task based on the at least one function name. For example, a step corresponding to a function name "gather" in the algorithm may be obtained as a gather task, a step corresponding to a function name "apply" in the algorithm may be obtained as an apply task, and a step corresponding to a function name "scatter" in the algorithm may be obtained as a scatter task.

Manner 2: The graph computing apparatus divides the algorithm into a plurality of tasks based on a programming model of the algorithm.

The manner 2 may include either of or a combination of a plurality of the following manner (2.1) and manner (2.2).

Manner (2.1): The graph computing apparatus divides the algorithm into a gather task, an apply task, and a scatter task based on the GAS model.

For example, based on processing logic of each step in the algorithm, the graph computing apparatus may classify a step whose processing logic is to obtain data from the neighboring vertices of a vertex on the graph and a step whose processing logic is to obtain data of an edge on the graph into the gather task, classify a step whose processing logic is to update the data of the vertex on the graph and a step whose processing logic is to synchronize the data of the vertex on the graph with its mirror vertex into the apply task, and classify a step whose processing logic is to update the data of the vertex on the graph and a step whose processing logic is to synchronize the data of the vertex on the graph with its mirror vertex into the scatter task.

Manner (2.2): The graph computing apparatus divides the algorithm into a local task, a communication task, and a synchronization task based on the BSP model.

For example, based on processing logic of each step in the algorithm, the graph computing apparatus may classify a step whose processing logic is to perform computing based on data at a local end into the local task, classify a step whose processing logic is to interact with another device other than the local end into the communication task, and classify a step whose processing logic is to wait for the communication task to complete into the synchronization task.

In some possible embodiments, for a plurality of algorithms that use the same programming model, the graph computing apparatus may divide the plurality of algorithms into a plurality of tasks based on the programming model, and a plurality of tasks in different algorithms are of the same type. For example, if both the algorithm 1 and the algorithm 2 accord with the GAS model, the graph computing apparatus may divide the algorithm 1 into the gather task, the apply task, and the scatter task, and also divide the algorithm 2 into the gather task, the apply task, and the scatter task.

It should be noted that, dividing the algorithm into tasks based on the GAS model or the BSP model is merely an example. In some possible embodiments, the algorithm may be implemented based on a programming model other than the GAS model or the BSP model, and correspondingly, the algorithm may be divided into tasks based on the other programming model. The programming model used for dividing the algorithm is not limited in this embodiment.

Figure 8:
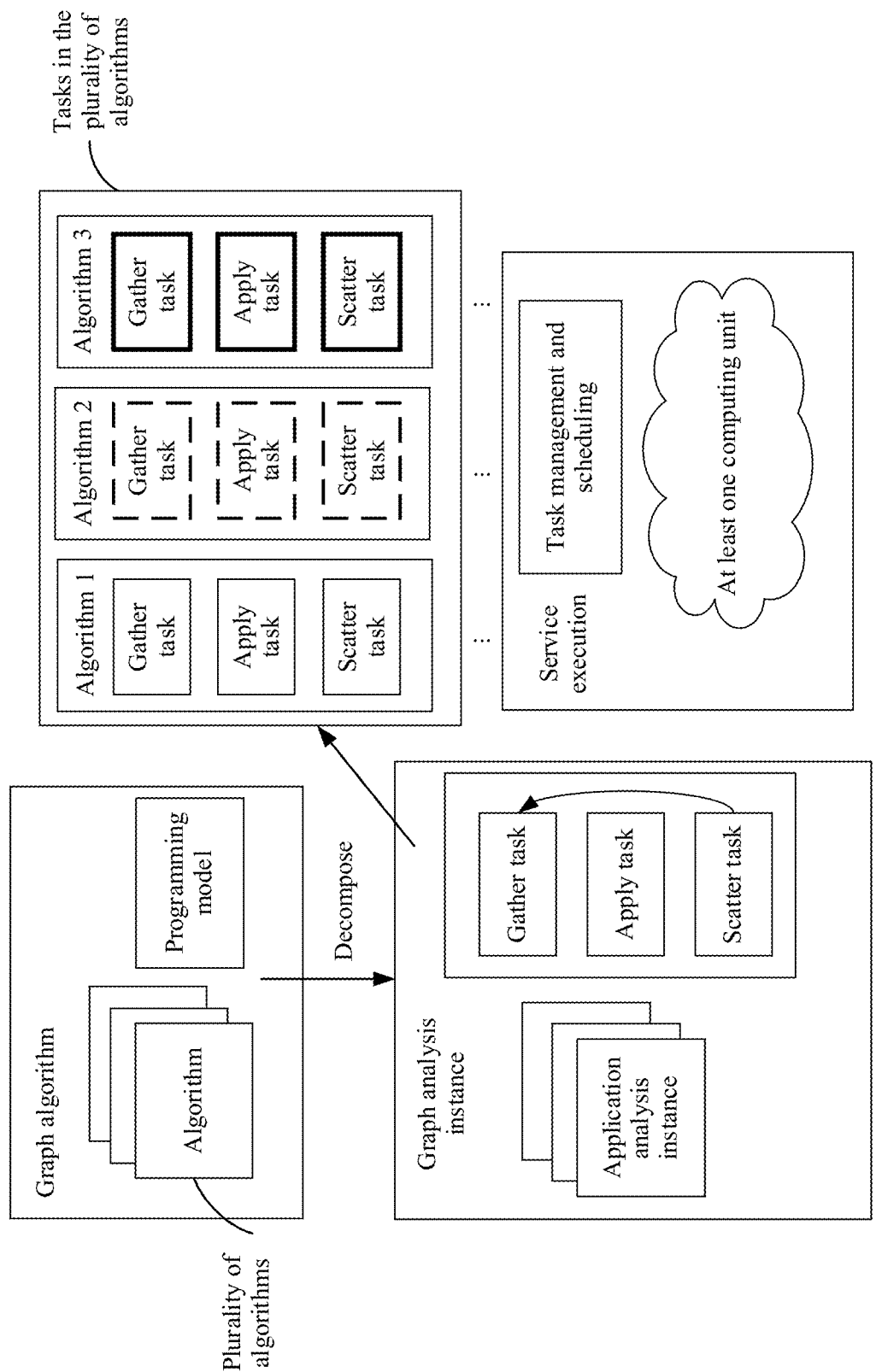
FIG. 8 is a schematic diagram of algorithm decomposition and unified management of a plurality of algorithms according to this application.

For example, FIG. 8 is a schematic diagram of algorithm decomposition and unified management of a plurality of algorithms. Any algorithm executed by the graph computing apparatus is usually an instance of the algorithm, that is, implemented based on a specific algorithm (for example, a shortest path algorithm or a subgraph matching algorithm) and software of a given programming model. As shown in FIG. 8, a solid-line box, a dashed-line box, and a bold box separately represent different algorithms, and each algorithm is implemented as one instance of a graph analysis application by using one programming model. The GAS model is used as an example. Based on such a programming model, each type of algorithm can be decomposed into a combination of three types of tasks, namely, the gather task, the apply task, and the scatter task. Each task functions on the graph according to a specific rule. Execution processes of the three operators form one iteration of a graph computing process. An arrow from the scatter task to the gather task indicates that the algorithm is formed through a series of iterations. It can be learned that, various algorithms on a graph computing platform can be decomposed into a series of tasks, and these tasks are assigned to computing units in the cloud or offline computing units. Because each algorithm is decomposed into smaller tasks, execution of a plurality of algorithms may be mixed. For different algorithms, data access manners of tasks of the same type are consistent. For example, data access manners of gather tasks in the algorithm 1, the algorithm 2, and the algorithm 3 are consistent, and data access manners of scatter tasks in the algorithm 1, the algorithm 2, and the algorithm 3 are consistent.

The algorithm is decomposed into tasks. For different algorithms used for processing the same graph, tasks that have the same data access manner can be gathered together, so that the gap between the different algorithms is eliminated, and similarity in data access modes of the tasks can be exposed. In this way, the tasks are properly scheduled and assigned based on the tasks of the same type access a graph in similar manners, so that system resources are properly used and scheduled to provide a service with higher overall performance. In particular, during multi-user multi-algorithm concurrent execution, decomposing the plurality of algorithms into tasks facilitates unified management on the plurality of algorithms.

Manner 3: The graph computing apparatus classifies steps of the same execution body in the algorithm into one task based on an execution body of each step in the algorithm.

An execution body of a step is hardware or software that performs the step. In this embodiment, the execution body may be a computing unit, or may be a computing element that is included in the computing unit and that has a computing capability. For example, the computing unit may be a virtual machine, and the execution body may be a thread in the virtual machine. If a plurality of steps in the algorithm need to be separately performed by using T threads in the virtual machine, steps performed by the same thread may be classified into one task.

Manner 4: The graph computing apparatus may classify steps with the same access sequence in the algorithm into one task based on an access sequence for vertices or edges on the graph in each step in the algorithm.

For example, steps, in the algorithm, of performing access from a vertex to a previous vertex may be classified into one task, and steps, in the algorithm, of performing access from a vertex to a subsequent vertex may be classified into another task.

Manner 5: The graph computing apparatus classifies steps, in the algorithm, in which the same vertex or edge on the graph is accessed into one task based on a vertex or an edge accessed on the graph in each step in the algorithm.

For example, if the algorithm includes five steps, a vertex 1, a vertex 2, . . . , and a vertex 1000 are to be accessed in step 1 and step 2, a vertex 1001, a vertex 1002, . . . , and a vertex 6000 are to be accessed in step 3 and step 6, and a vertex 6001, a vertex 6002, . . . , and a vertex 7000 are to be accessed in step 5, step 1 and step 2 may be classified into a task 1, step 3 and step 6 may be classified into a task 2, and step 5 may be classified into a task 3.

Manner 6: The graph computing apparatus may classify each step in the algorithm into one task.

For example, if the algorithm includes H steps, the algorithm may be divided into H tasks, and each task includes one step, where H is a positive integer.

Manner 7: The graph computing apparatus may classify steps of the same action in the algorithm into one task based on an action executed in each step in the algorithm.

For example, if the algorithm includes three steps, an action of obtaining data 1 on the graph is to be executed in step 1, an action of obtaining data 2 on the graph is to be executed in step 2, and an action of obtaining an average value of the data 1 and the data 2 is to be executed in step 3, step 1 and step 2 may be classified into a task 1, and step 3 is classified into a task 2.

Manner 8: The graph computing apparatus may classify steps that belong to the same iteration process in the algorithm into one task based on an iteration process to which each step in the algorithm belongs.

For example, if the algorithm includes R iteration processes, all steps in the first iteration process may be classified into a task 1, all steps in the second iteration process may be classified into a task 2, all steps in the third iteration process may be classified into a task 3, and so on. R is a positive integer.

Manner 9: The graph computing apparatus may classify steps that belong to the same determining branch in the algorithm into one task based on a determining branch to which each step in the algorithm belongs.

For example, if the algorithm includes the following: if data is greater than a threshold, processing step 1, processing step 2, and processing step 3 are performed on the data, and if the data is not greater than the threshold, processing step 6 and processing step 5 are performed on the data, the processing step 1, the processing step 2, and the processing step 3 may be classified into a task 1, and the processing step 6 and the processing step 5 may be classified into a task 2.

In some possible embodiments, for any algorithm in the plurality of algorithms, the graph computing apparatus may perform the steps other than a loading step in the algorithm, and the loading step is a step of loading the graph to the memory of the computing unit. For example, the steps other than the loading step may be classified into at least one task, and the at least one task obtained through classification is executed in parallel by using the plurality of computing units.

In this implementation, for the same subgraph, in a process of executing a plurality of algorithms on the subgraph, a process of loading the subgraph into the memory of the computing unit when the one or more algorithms are executed is avoided. In this way, time overheads and performance overheads caused by repeatedly loading the same subgraph are saved.

In some possible embodiments, for any algorithm in the plurality of algorithms, the graph computing apparatus may perform the steps other than a releasing step in the algorithm. The releasing step is a step of releasing the graph from the memory of the computing unit. For example, the steps other than the releasing step may be classified into at least one task, and the at least one task obtained through classification is executed in parallel by using the plurality of computing units.

In this implementation, for the same subgraph, in a process of executing a plurality of algorithms on the subgraph, a process of releasing the subgraph from the memory of the computing unit when the one or more algorithms are executed is avoided. In this way, time overheads and performance overheads caused by repeatedly releasing the same subgraph are saved.

Step 2: The graph computing apparatus executes tasks in the plurality of algorithms in parallel by using the plurality of computing units.

For example, for any computing unit, the computing unit may execute tasks in different algorithms in the plurality of algorithms in parallel on the same subgraph. The graph computing apparatus may assign tasks in the plurality of algorithms to the plurality of computing units, and each computing unit may execute, in parallel, the tasks assigned by the graph computing apparatus.

In some possible embodiments, the graph computing apparatus may create a task pool, and after obtaining the tasks in the plurality of algorithms, the graph computing apparatus may cache the tasks in the plurality of algorithms in the task pool. The graph computing apparatus may select one or more tasks from the task pool, and assign the one or more tasks to the plurality of computing units. Each computing unit may execute, in parallel, the tasks assigned by the graph computing apparatus. After execution of the assigned tasks by the plurality of computing units ends, the graph computing apparatus may select one or more remaining tasks from the task pool, and assign the one or more remaining tasks to the plurality of computing units, and each computing unit may execute, in parallel again, the tasks assigned by the graph computing apparatus, and so on, until the task pool is empty, in other words, all the tasks in the plurality of algorithms are assigned. In a task assignment process, each task may be assigned to only one subgraph in one modality, and one or more tasks may be assigned to each subgraph in each modality.

Figure 9:
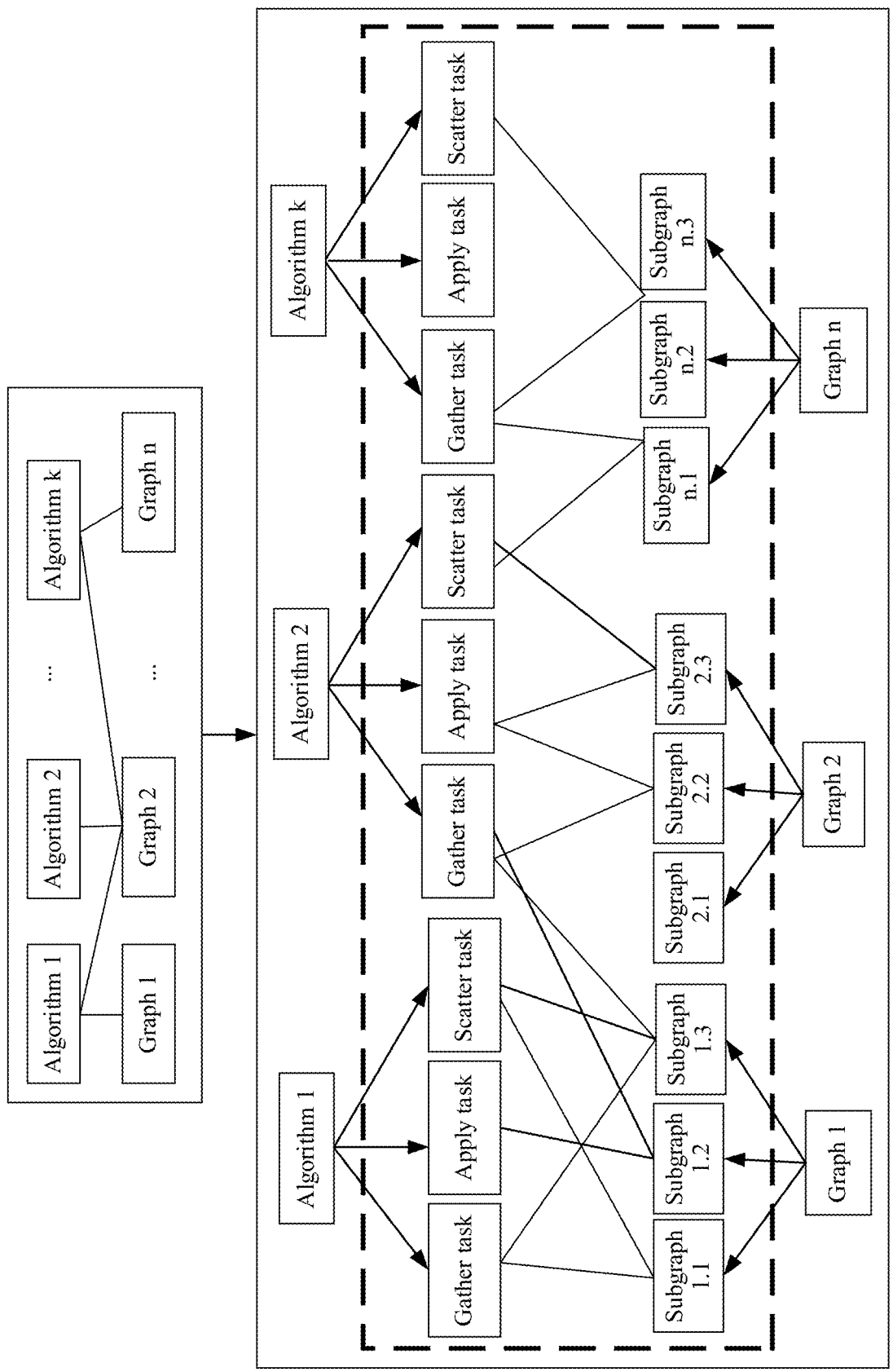
FIG. 9 is a schematic diagram of task scheduling of a plurality of algorithms according to this application.

For example, as shown in FIG. 9, a solid-line box in an upper part in FIG. 9 includes an algorithm 1, an algorithm 2, . . . , and an algorithm k and a graph 1, a graph 2, . . . , and a graph n, represents a correspondence between an algorithm and a graph, and reflects a group of algorithms to be executed in a concurrent execution environment and a graph on which each algorithm needs to be processed. A dashed-line box in a solid-line box in a lower part in FIG. 9 represents a correspondence between a task and a subgraph, is a fine-grained expression for the solid-line box in the upper part in FIG. 9, and reflects a group of tasks to be executed in the concurrent execution environment and a subgraph in a specific modality on which each task needs to be processed. A task assignment process can be considered as a process of selecting a group of edges from the dashed-line box, and k and n are positive integers.

By using the foregoing step 1 and step 2, different algorithms are decomposed into a series of tasks, so that the plurality of algorithms can be fully mixed and executed together, to better support concurrent execution of the plurality of algorithms. In addition, because a granularity of the task is finer than a granularity of the algorithm, more scheduling space is provided, a loaded subgraph can be better used, and more concurrent analysis algorithms can be served, so that overall system performance during batch processing is improved.

In some possible embodiments, the graph computing apparatus may associate a subgraph modality with a task assignment process. Specifically, step 2 may include the following step (2.1) and step (2.2).

Step (2.1): The graph computing apparatus may load a plurality of subgraphs of the graph that are in at least one modality to the plurality of computing units. For example, for each of the plurality of computing units, the graph computing apparatus may load a subgraph in an incoming edge modality and a subgraph in an outgoing edge modality to the computing unit.

Step (2.2): For any task in the plurality of algorithms, execute the task based on a subgraph in a target modality.

The target modality is a modality that is in the at least one modality and that matches the task. For example, an arrangement sequence of vertices on the subgraph in the target modality may be consistent with a sequence of searching for the vertices in the task. In some possible embodiments, two vertices on the graph are used as an example. The two vertices may be separately referred to as a first vertex and a second vertex. The task may include a step of performing searching from the first vertex to the second vertex on the graph, in other words, the first vertex is a vertex accessed first in the task, and the second vertex is a vertex accessed later in the task. The second vertex is arranged in front of the first vertex on the subgraph in the target modality, in other words, the second vertex is arranged in front of the first vertex on the subgraph.

In some possible embodiments, update to information on the graph is usually from data flowing along the edge and computing performed on the vertex. The data flowing along the edge includes two aspects: (1) Each vertex obtains latest data from a preceding vertex of the vertex in an incoming edge direction, to update local information of the vertex; (2) Each vertex propagates latest local information of the vertex to a subsequent node in an outgoing edge direction. Therefore, the subgraph may be expressed as two modalities. The incoming edge modality represents an incoming edge relationship of the subgraph, and the outgoing edge modality represents an outgoing edge modality relationship of the subgraph.

Figure 10:
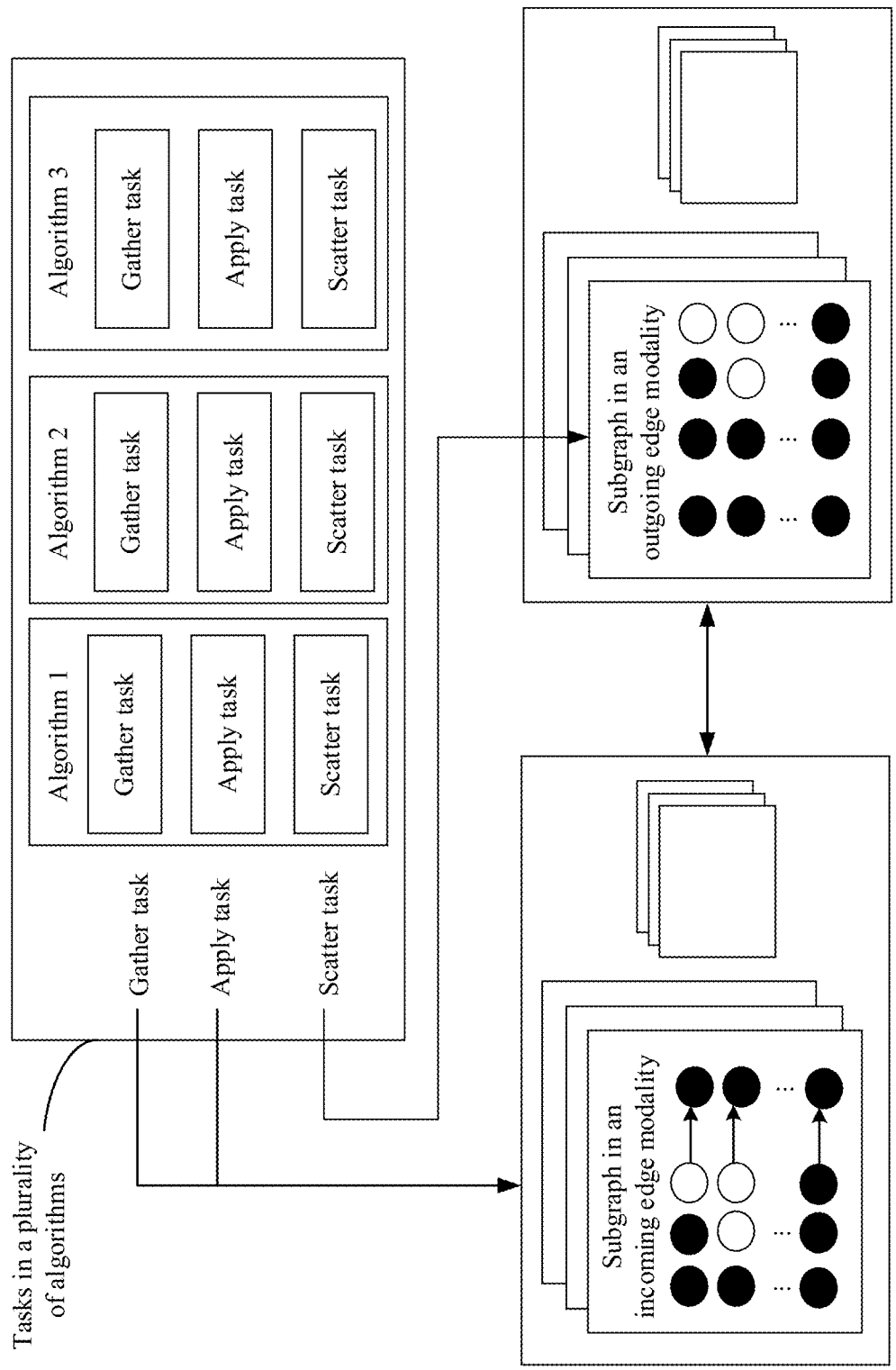
FIG. 10 is a schematic diagram of task scheduling based on a subgraph modality according to this application.

Accordingly, step (2.2) may include: executing the gather task based on a subgraph in the incoming edge modality, and executing the scatter task based on a subgraph in the outgoing edge modality. Gather tasks in a plurality of algorithms may be executed in parallel based on the same subgraph in the incoming edge modality, and scatter tasks in the plurality of algorithms may be executed in parallel based on the same subgraph in the outgoing edge modality. For example, as shown in FIG. 10, gather tasks in the algorithm 1, the algorithm 2, and the algorithm 3 may be executed in parallel based on the same subgraph in the incoming edge modality.

According to the foregoing step (2.1) and step (2.2), an affinity between different types of tasks and subgraphs in different modalities is considered, multi-modality management of the graph is implemented, and task assignment can be associated with a modality of the subgraph, so that a task is assigned to a computing unit into which a proper subgraph is loaded. A relatively optimized data structure may be provided for the task, to alleviate a problem of limited data locality that is common in the graph computing field, so that an execution speed of a computing task is improved. For example, in an algorithm constructed based on the GAS model, in tasks obtained after the algorithm is decomposed, because pre-order information of each vertex needs to be accessed in the gather task, and on the subgraph in the incoming edge modality, pre-order information of all vertices is exactly aggregated together, data locality can be improved. Similarly, for the scatter task, if information needs to be provided for all subsequent nodes in the scatter task, the scatter task is assigned to a computing unit into which an outgoing edge modality is loaded, and the computing unit processes the scatter task, so that data locality and computing efficiency can be improved.

In addition, information update may be provided for a mirror node by using a mini-batch synchronization mechanism between the subgraph in the incoming edge modality and the subgraph in the outgoing edge modality.

In some possible embodiments, the graph computing apparatus may obtain a scheduling scheme between a task and a subgraph, and execute tasks in a plurality of algorithms in parallel based on the scheduling scheme. Specifically, step 603 may include the following step A to step C.

Step A: The graph computing apparatus obtains priorities of the plurality of algorithms.

In some possible embodiments, a priority obtaining manner includes but is not limited to either of or a combination of a plurality of the following manner 1 and manner 2.

Manner 1: The graph computing apparatus obtains the priorities of the plurality of algorithms according to a configuration indication, where the configuration indication is used to indicate the priorities of the plurality of algorithms.

In some possible embodiments, the configuration indication may carry an importance coefficient of each algorithm. The graph computing apparatus may obtain the importance coefficient of each algorithm according to the configuration indication, and obtain a priority of each algorithm based on the importance coefficient of each algorithm. A priority of an algorithm may be positively correlated with an importance coefficient of the algorithm. The importance coefficient represents importance of the algorithm. A larger importance coefficient indicates higher importance of the algorithm and a more urgent need to be scheduled in time. A value range of the importance coefficient may be controlled within an interval between 0 and 1 through normalization.

Manner 2: The graph computing apparatus obtains the priorities of the plurality of algorithms based on quantities of iterations of the plurality of algorithms.

The graph computing apparatus may obtain the quantities of iterations of the plurality of algorithms, and perform operations on the quantities of iterations of the plurality of algorithms to obtain the priorities of the plurality of algorithms. The quantity of iterations of an algorithm is the quantity of times that the graph is computed by using the algorithm, in other words, the quantity of times that the algorithm has been currently executed. The quantity of iterations of the algorithm may be less than or equal to the total quantity of times that the algorithm needs to be computed. In some possible embodiments, if it is expected that a result of a new task can be obtained as soon as possible, a value that is negatively correlated with the quantity of iterations may be obtained as a priority of an algorithm. Therefore, because the quantity of iterations of the new task is relatively small, the new task can be scheduled preferentially, so that the new task can be executed by the computing unit as soon as possible. In some other possible embodiments, if it is expected that a result of a former task that has been executed for a relatively long time can be obtained as soon as possible, a value that is positively correlated with the quantity of iterations may be obtained as a priority of an algorithm. Therefore, because the quantity of iterations of the former task is relatively large, the former task can be scheduled preferentially, so that the former task can be executed as soon as possible.

For example, the graph computing apparatus may perform operations on the importance coefficients of the plurality of algorithms and the quantities of iterations of the plurality of algorithms based on any one of or a combination of a plurality of the following formula (1), formula (2), and formula (3) to obtain the priorities of the plurality of algorithms.

$$a_{iA\cdot jG} = \delta_{iA\cdot jG} * \rho_{<A,G>} * e^{-t(A,G)} \quad (1)$$

$$a_{i,A\cdot jG} = \delta_{iA\cdot jG} * \rho_{<A,G>} * (1 - e^{-t(A,G)}) \quad (2)$$

$$a_{iA\cdot jG} = 1 \quad (3)$$

$a_{iA,jG}$ represents a priority for computing a graph G by using an algorithm A, ρ<A,G> is an importance coefficient for computing the graph G by using the algorithm A, ρ<A,G> is normalized, ρ<A,G> is greater than 0 and is less than or equal to 1, t<A,G> is the quantity of current iterations for computing the graph G by using the algorithm A, δ<iA,jG> is a Dirac Delta function, and * indicates multiplication. If a computing request indicates that the algorithm A is used to compute the graph G, δ<iA,jG> is 1. If a computing request does not indicate that the algorithm A is used to compute the graph G, δ<iA,jG> is 0.

In some possible embodiments, the user may control, by using the configuration indication, whether the new task is preferentially scheduled or the former task is preferentially scheduled. Specifically, if the user expects that the new task is preferentially scheduled, the configuration indication used to indicate the graph computing apparatus to perform an operation based on the formula (1) may be triggered. After receiving the configuration indication, the graph computing apparatus obtains a priority of an algorithm based on the formula (1), so that the priority of the algorithm is negatively correlated with the quantity of iterations of the algorithm. If the user expects that the former task is preferentially scheduled, the configuration indication used to indicate the graph computing apparatus to perform an operation based on the formula (2) may be triggered. After receiving the configuration indication, the graph computing apparatus obtains a priority of an algorithm based on the formula (2), so that the priority of the algorithm is positively correlated with the quantity of iterations of the algorithm. In this way, a scenario in which the graph is executed by using an iterative algorithm is fully considered, so that it can be ensured that a manner for defining the priority of the algorithm can be customized by the user to meet a user requirement. In other words, a system can implement scheduling based on different scheduling targets, so that the system has a good configurable capability.

Step B: The graph computing apparatus obtains a scheduling scheme based on a priority of each of the plurality of algorithms.

The scheduling scheme is used to indicate a correspondence between at least one target task and at least one target subgraph. For example, the scheduling scheme may include an identifier of the at least one target task and an identifier of the at least one target subgraph. Each target task is a task in the plurality of algorithms, the target task is a task that is currently scheduled in the tasks in the plurality of algorithms, and the target subgraph is a subgraph that is currently scheduled in the plurality of subgraphs.

The priority of the algorithm is used to indicate a priority of the algorithm in the plurality of algorithms. Each time the tasks in the plurality of algorithms need to be scheduled, tasks in a plurality of algorithms with higher priorities may be scheduled first, and then tasks in a plurality of algorithms with lower priorities may be scheduled, to control execution end time of different algorithms, so that execution of an algorithm with a higher priority can end as soon as possible.

In some possible embodiments, a process of generating the scheduling scheme may include the following steps (B.1) to (B.3).

Step (B.1): The graph computing apparatus generates a first bipartite graph.

The first bipartite graph is used to indicate a scheduling relationship between a graph and an algorithm, and the first bipartite graph may be considered as a coarse-grained bipartite graph. The first bipartite graph includes a first vertex, a second vertex, and a first edge. The first vertex represents a graph, the second vertex represents an algorithm, the first edge connects the first vertex and the second vertex, and the first edge represents a computing request that is in currently received computing requests and that is used to request to compute the graph corresponding to the first vertex by using the algorithm corresponding to the second vertex.

Figure 11:
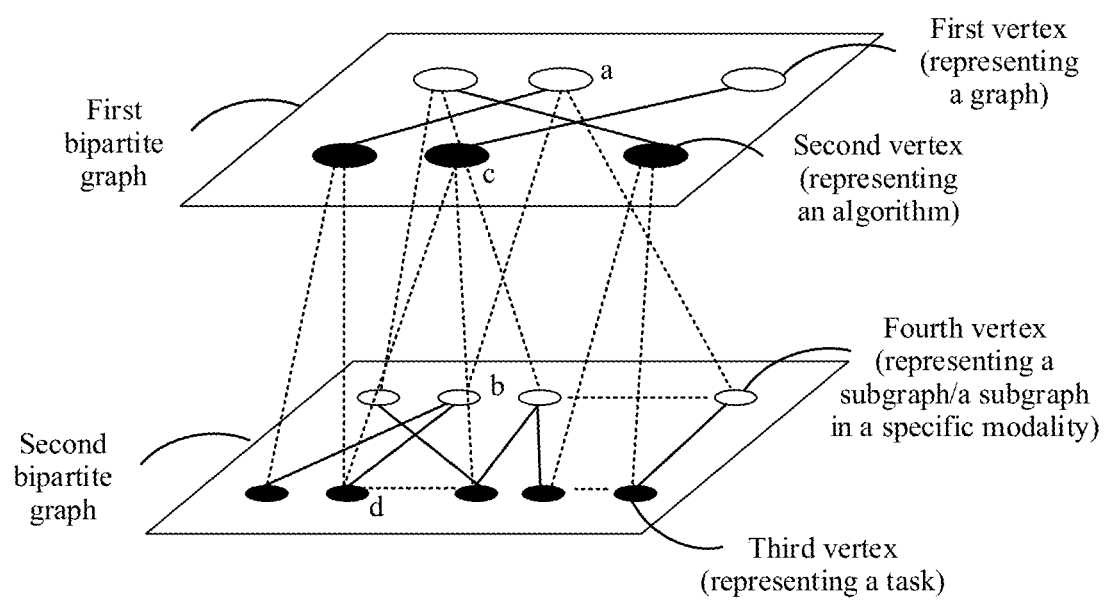
FIG. 11 is a schematic diagram of a first bipartite graph and a second bipartite graph according to this application.

For example, as shown in FIG. 11, the first bipartite graph may be a bipartite graph on a top layer in FIG. 11, first vertices are a row of hollow vertices at an inner side of the bipartite graph on the top layer, second vertices are a row of solid vertices at an outer side of the bipartite graph on the top layer, and a first edge is a solid line on the bipartite graph on the top layer. On the bipartite graph on the top layer in FIG. 11, a plurality of second vertices connected to the same first vertex represent a request that is included in a batch of computing requests received by the graph computing apparatus and that is used to request to execute a plurality of algorithms on the same graph. In this scenario, the plurality of algorithms may be concurrently executed to improve a computing speed.

Step (B.2): The graph computing apparatus generates a second bipartite graph based on the first bipartite graph.

The second bipartite graph is used to indicate a scheduling relationship between a subgraph and a task, and the second bipartite graph may be considered as a fine-grained bipartite graph. The second bipartite graph includes a third vertex, a fourth vertex, and a second edge, the third vertex represents a task, the fourth vertex represents a subgraph, and the second edge connects the third vertex and the fourth vertex. With reference to a modality of a subgraph, the second bipartite graph may be used to indicate a scheduling relationship between a subgraph in any modality and a task, and the fourth vertex represents a subgraph in a specific modality. In addition, the second edge may be determined based on an edge on the first bipartite graph. For example, if a currently received batch of computing requests include a computing request for computing a graph j by using an algorithm i, on the first bipartite graph, a first vertex corresponding to the algorithm i and a second vertex corresponding to the graph j are connected by using the first edge, and correspondingly, on the second bipartite graph, a third vertex corresponding to each task in the algorithm i and a fourth vertex corresponding to each subgraph of the graph j are connected by using the second edge.

For example, as shown in FIG. 11, the second bipartite graph may be a bipartite graph on a bottom layer in FIG. 11, third vertices are a row of solid vertices at an outer side of the bipartite graph on the bottom layer, fourth vertices are a row of hollow vertices at an inner side of the bipartite graph on the bottom layer, and a second edge is a solid line on the bipartite graph on the bottom layer.

In some possible embodiments, the first vertex may be mapped to the fourth vertex based on a correspondence between a graph and a subgraph, the second vertex is mapped to the third vertex based on a correspondence between an algorithm and a task, and the first edge is mapped to the second edge, to obtain the second bipartite graph.

For example, as shown in FIG. 11, the correspondence between a graph and a subgraph and the correspondence between an algorithm and a task may be represented by using a hierarchical relationship between the bipartite graph on the top layer and the bipartite graph on the bottom layer. Specifically, one correspondence between a graph and a subgraph may be represented by one inner-side dashed line between the bipartite graph on the top layer and the bipartite graph on the bottom layer. For example, a correspondence between a graph A and a subgraph B may be represented by using a dashed line between a vertex a at the inner side of the bipartite graph on the top layer and a vertex b at the inner side of the bipartite graph on the bottom layer. One correspondence between an algorithm and a task may be represented by using one outer-side dashed line between the bipartite graph on the top layer and the bipartite graph on the bottom layer. For example, a correspondence between an algorithm C and a task D may be represented by using a dashed line between a vertex c at the outer side of the bipartite graph on the top layer and a vertex d at the outer side of the bipartite graph on the bottom layer.

Step (B.3): The graph computing apparatus selects a target edge from the second bipartite graph, and uses, as the scheduling scheme, a correspondence that is between a task and a subgraph and that is represented by the target edge.

A process of obtaining the scheduling scheme may be modeled as a process of selecting a group of edges from the bipartite graph on the bottom layer, and the selected edge may be referred to as the target edge herein. A third vertex connected by the target edge is a task to be scheduled currently, and a fourth vertex connected by the target edge is a subgraph to be scheduled currently. In some possible embodiments, considering that one task is assigned to a maximum of one subgraph, the same third vertex in one group of target edges is connected to a maximum of one fourth vertex. In addition, because one subgraph can be assigned to one or more tasks, the same fourth vertex in one group of target edges may be connected to one or more third vertices.

For example, a process of selecting the target edge may include the following step (B.3.1) and step (B.3.2).

Step (B.3.1): For each edge on the first bipartite graph, the graph computing apparatus obtains a weight of the edge based on a subgraph and a task that are corresponding to the edge.

Step (B.3.1) may include either of or a combination of a plurality of the following manner 1 and manner 2.

Manner 1: Obtain an importance coefficient corresponding to the edge, and obtain the weight of the edge based on the importance coefficient.

For example, if the first vertex connected by the edge represents a graph G, and the second vertex connected by the edge represents an algorithm A, an importance coefficient for computing the graph G by using the algorithm A may be obtained, and an operation is performed on the importance coefficient to obtain the weight, where the weight is positively correlated with the importance coefficient.

Manner 2: Obtain the quantity of iterations corresponding to the edge, and obtain the weight of the edge based on the quantity of iterations.

For example, if the first vertex connected by the edge represents a graph G, and the second vertex connected by the edge represents an algorithm A, the quantity of times that the graph G is computed by using the algorithm A may be obtained, and an operation is performed on a quantity of iterations to obtain the weight.

It should be noted that one of the manner 1 and the manner 2 may be executed, or the manner 1 and the manner 2 may be executed in combination. For example, if the manner 1 and the manner 2 are combined, the importance coefficient and the quantity of iterations that are corresponding to the edge may be obtained, and operations are performed on the importance coefficient and the quantity of iterations to obtain the weight of the edge. For example, the operations may be performed on the importance coefficient and the quantity of iterations by using either of the foregoing formula (1) and formula (2).

Step (B.3.2): The graph computing apparatus selects the target edge from the first bipartite graph based on the weight of each edge on the first bipartite graph, where a weight of the target edge meets a preset condition.

The preset condition may include: A sum of weights is the largest in sums of weights of a plurality of edges on the second bipartite graph, a sum of weights is at first preset rankings in sums of weights of a plurality of edges on the second bipartite graph, a sum of weights exceeds a threshold, and the like.

In some possible embodiments, the graph computing apparatus may select the target edge by using a linear programming method by using a constraint condition. Specifically, the graph computing apparatus may obtain a target function based on the first bipartite graph, and perform an operation on the target function based on the constraint condition by using a linear programming algorithm, to obtain a solution of the target function as the target edge.

The target function is used to select the target edge from the first bipartite graph. For example, the target function may indicate a group of edges with a largest solved sum of weights. For example, the target function may be shown in the following formula (4).

$$\max(TrB^TX) \tag{4}$$

In the formula, max represents a maximum value, Tr represents matrix tracing, B is transposing of an importance matrix A, and $B=c+\log_2|A|$, where c is a constant, and B and c may be used in a preconditioning technology of the matrix, so that benefits in terms of numerical calculation can be obtained. A is an importance coefficient matrix, each row in A represents tasks obtained after an algorithm is decomposed, each column in A represents one subgraph in one modality, and each non-zero element in A indicates that a task corresponding to the element and a subgraph corresponding to the element can be matched through assignment, and a value of the non-zero element is an importance coefficient for executing a task on the subgraph. X is a permutation matrix, and X is used to exchange columns of $B^T$, so that a sum of elements on a diagonal line of a matrix obtained after the exchanging is the largest, in other words, a group of optimal solutions are found. A correspondence that is between a task and a subgraph and that is represented by the element on the diagonal line is the selected scheduling scheme.

The constraint condition is used to ensure that different edges in target edges are disjoint. For example, the constraint condition may be used to constrain that each row in X solved by using the foregoing formula (4) has only one 1, and each column has only one 1. For example, the constraint condition may include the following formula (5), the following formula (6), and the following formula (7), where T represents a transpose operation.

$$X\vec{1}+\vec{1}^T \tag{5}$$

$$X^T\vec{1}^T=\vec{1} \tag{6}$$

$$X^T\vec{1}^T=\vec{1} \tag{7}$$

The linear programming algorithm may be a subgraph matching algorithm of a bipartite graph, for example, may be an auction algorithm or a Hungarian augmented path algorithm.

Through running of the foregoing linear programming algorithm, X in the foregoing formula (4) may be obtained, X is a group of disjoint edges on the second bipartite graph, and X exactly provides a group of scheduling schemes: A vertex (representing a task) at one end of a specific edge on the second bipartite graph and a vertex (representing a subgraph in a specific modality) at the other end are scheduled to be executed together.

In the foregoing implementation, an association relationship between a plurality of algorithms executed on the same graph is embodied in the coarse-grained first bipartite graph between an algorithm and a graph, and is further embodied in the fine-grained second bipartite graph. Therefore, when scheduling is performed based on the foregoing linear programming method, one subgraph in one modality can be processed in parallel by a plurality of tasks without being repeatedly loaded and evicted.

Step C: The graph computing apparatus executes the at least one target task in parallel by using the plurality of computing units into which the at least one target subgraph is loaded.

The graph computing apparatus may determine, based on the scheduling scheme, target tasks and target subgraphs that are to be scheduled currently, determine a computing unit into which the target subgraph is loaded, and execute the target task in parallel by using the computing unit into which the target subgraph is loaded. In some possible embodiments, after parallel execution of the target tasks by the computing unit ends, the graph computing apparatus may repeatedly perform the foregoing step A to step C, in other words, re-obtain the scheduling scheme to obtain a correspondence between a remaining task and a subgraph, to assign the remaining task until execution of the tasks in the plurality of algorithms ends.

Figure 12:
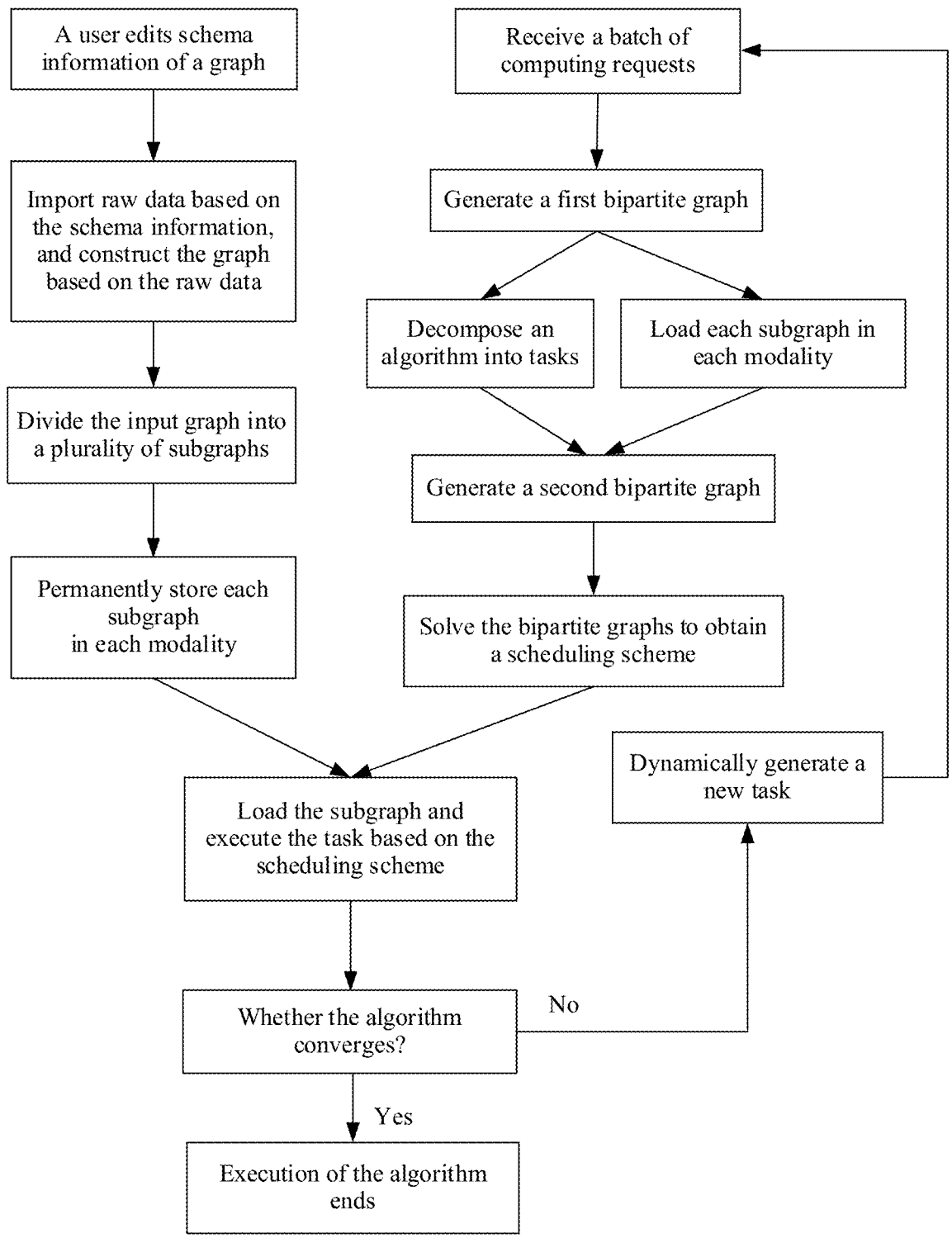
FIG. 12 is a flowchart of execution of an iterative algorithm according to this application.

FIG. 12 shows an example procedure of a graph computing method. A left branch in FIG. 12 may be executed in advance when the left branch is offline, and includes the following step (1) to step (4):

(1) A user edits schema information of a graph.
(2) Import raw data based on the schema information, and construct the graph based on the raw data.
(3) Divide the input graph into a plurality of subgraphs.
(4) Permanently store each subgraph in each modality.

A right branch in FIG. 12 may be executed in real time when the right branch is online, and includes the following step (5) to step (10):

(5) Receive a batch of computing requests.
(6) Generate a first bipartite graph.
(7) Decompose an algorithm into tasks and load each subgraph in each modality.
(8) Generate a second bipartite graph based on the task and the subgraph.
(9) Solve the bipartite graphs to obtain a scheduling scheme.
(10) Load the subgraph and execute the task based on the scheduling scheme.

Considering that most algorithms executed on the graph are iterative algorithms, as shown in FIG. 12, a process of computing the graph by using the iterative algorithm may further include the following step 1 to step 3.

Step 1: A computing unit executes, based on a plurality of subgraphs, a task in the first execution process of the iterative algorithm, to obtain a computing result of the first execution process.

Step 2: The computing unit determines whether the algorithm converges.

For example, the computing unit may determine, based on at least one of the computing result of the first execution process and the quantity of iterations, that the iterative algorithm has not converged. For example, the computing unit may determine whether the quantity of iterations reaches a preset quantity of times, and if the quantity of iterations does not reach the preset quantity of times, the computing unit determines that the iterative algorithm has not converged, or if the quantity of iterations reaches the preset quantity of times, the computing unit determines that the iterative algorithm has converged. For another example, the computing unit may determine whether the computing result of the first execution process meets a preset condition, and if the computing result of the first execution process does not meet the preset condition, the computing unit determines that the iterative algorithm has not converged.

Step 3: If the iterative algorithm has not converged, the computing unit executes a task in the second execution process of the iterative algorithm based on the plurality of subgraphs and the computing result of the first execution process, to obtain a computing result of the second execution process.

Then, the computing unit may re-determine whether the iterative algorithm converges, and if the iterative algorithm has not converged, the computing unit executes a task in the third execution process of the iterative algorithm based on the plurality of subgraphs and the computing result of the second execution process, and so on, until the iterative algorithm converges. A computing result of a current execution process may be output. For example, the computing result of the current execution process is visualized, so that the computing result of the current execution process is displayed.

In some possible embodiments, as shown in FIG. 12, for an algorithm that has not converged in the plurality of algorithms, a task in the algorithm that has not converged may be obtained as a remaining task, to dynamically generate a new task. If a next computing request is received, a task in an algorithm requested in the next computing request may be obtained, and the new task and the remaining task are executed concurrently until there is no new computing request that needs to be processed.

In some possible embodiments, in a process in which the plurality of computing units executes the plurality of algorithms in parallel, the graph computing apparatus may expand capacities of the plurality of computing units, to execute the algorithms by using more computing units. Specifically, for a capacity expansion process, refer to the following step 1 to step 8.

Step 1: The graph computing apparatus sends a capacity expansion request to a terminal.

The capacity expansion request is used to request to expand capacities of the plurality of computing units. In some possible embodiments, the capacity expansion request may include at least one of a quantity of to-be-added computing units and capacity expansion fees, and the capacity expansion fees are fees that a user needs to pay for the added computing unit. For example, if n needs to be paid for leasing one computing unit within unit duration, and m computing units need to be added currently, the capacity expansion request may include a quantity m of to-be-added computing units and capacity expansion fees (m×n), where m is a positive integer, and n is a positive number.

In some possible embodiments, when computing capabilities of the plurality of computing units do not meet requirements, the graph computing apparatus may generate the capacity expansion request, and send the capacity expansion request to the terminal. For example, a computing request sent by the terminal to the graph computing apparatus may include expected duration, and the expected duration is duration in which the user expects the plurality of computing units to complete graph computing. The graph computing apparatus may determine whether the plurality of computing units can complete the graph computing within the expected duration. If the plurality of computing units cannot complete the graph computing within the expected duration, the graph computing apparatus may generate the capacity expansion request. For another example, the graph computing apparatus may monitor a load status of each computing unit, and determine in real time whether the load status of each computing unit exceeds a threshold. When a load status of one or more computing units exceeds the threshold, the graph computing apparatus may generate the capacity expansion request. For another example, the plurality of computing units may monitor whether load statuses of the plurality of computing units exceed a threshold, and if the load statuses of the plurality of computing units exceed the threshold, the plurality of computing units send notification messages to the graph computing apparatus. After receiving the notification message of the one or more computing units, the graph computing apparatus may generate the capacity expansion request. For another example, the graph computing apparatus may determine, based on a data amount of the graph and a specification of each computing unit, whether a total data amount that can be computed by the plurality of computing units is greater than the data amount of the graph, and if the total data amount that can be computed by the plurality of computing units is less than or equal to the data amount of the graph, the graph computing apparatus may generate the capacity expansion request.

Step 2: The terminal receives the capacity expansion request of the graph computing apparatus, and displays prompt information.

The prompt information is used to notify the user of whether to expand capacities of the plurality of computing units. In some possible embodiments, the prompt information may further include at least one of the quantity of to-be-added computing units and the capacity expansion fees.

Step 3: The terminal receives an acknowledgment indication, generates a capacity expansion indication, and sends the capacity expansion indication to the graph computing apparatus, where the capacity expansion indication is used to indicate to expand the capacities of the plurality of computing units.

The acknowledgment indication is used to indicate an acknowledgment to expand the capacities of the plurality of computing units, and the acknowledgment indication may be triggered by using an acknowledgment operation performed by the user on the terminal. For example, the prompt information displayed by the terminal may include an acknowledgment option, and if the user triggers a tap operation for the acknowledgment option, the terminal receives the acknowledgment indication.

Step 4: The graph computing apparatus receives the capacity expansion indication of the terminal.

In some possible embodiments, after receiving the acknowledgment indication, the terminal may send a payment request to a financial server, where the payment request includes the capacity expansion fees, an identifier of a user account, and an identifier of a merchant account corresponding to the graph computing apparatus. After receiving the payment request, the financial server obtains the identifier of the user account and the identifier of the merchant account from the payment request, deducts the capacity expansion fees from the user account, and adds the capacity expansion fees to the merchant account. After the deduction succeeds, the financial server may send a payment success message to the terminal. After receiving the payment success message, the terminal sends the capacity expansion indication to the graph computing apparatus, and the graph computing apparatus receives the capacity expansion indication, and performs the following step 5. Alternatively, the financial server may send a payment success message to the graph computing apparatus, and after receiving the payment success message and receiving the capacity expansion indication, the graph computing apparatus performs the following step 5.

It should be noted that, the foregoing description is provided only by using an example in which the graph computing apparatus and the financial server are two separate apparatuses. In some other possible embodiments, the graph computing apparatus and the financial server may be integrated, and an integrated apparatus has both a graph computing function and an online transaction function. In this implementation, the integrated apparatus may prestore the identifier of the merchant account. After receiving the confirmation indication, the terminal may send the payment request to the integrated apparatus. After receiving the payment request, the integrated apparatus deducts the capacity expansion fees from the user account, and adds the capacity expansion fees to the merchant account. After the deduction succeeds, the integrated apparatus may perform the following step 5.

Step 5: The graph computing apparatus creates at least one computing unit.

Step 6: The graph computing apparatus copies at least one subgraph of the graph to obtain an instance of the at least one subgraph.

The instance of the subgraph is a copy of the subgraph, and the instance of the subgraph may be the same as the subgraph.

Step 7: The graph computing apparatus loads the instance of the at least one subgraph to the created at least one computing unit.

Step 7 is similar to step 602, and details are not described herein.

Step 8: The graph computing apparatus executes the plurality of algorithms in parallel by using the created at least one computing unit.

Step 8 is similar to step 603, and details are not described herein.

In some possible embodiments, the graph computing apparatus may count the quantity of times that each subgraph of the graph is requested by the plurality of algorithms, determine whether the quantity of times that each subgraph is requested reaches a threshold, and copy a subgraph that is of the graph and whose quantity of times of being requested reaches the threshold, to obtain an instance of the subgraph whose quantity of times of being requested reaches the threshold. The instance of the subgraph is loaded into a target computing unit obtained after capacity expansion, and the target computing unit executes the plurality of algorithms in parallel on the instance of the subgraph. The quantity of times of being requested is a sum of quantities of times that the subgraph is requested by using the plurality of algorithms.

In this implementation, in consideration of a fact that the quantity of accesses that can be supported by a single graph has a physical upper limit, if the quantity of accesses of the graph exceeds the physical upper limit, it is likely that parallel execution of the plurality of algorithms on the graph cannot be supported, and consequently a bottleneck is caused to an execution process of the algorithm on the graph. For example, if a subgraph is a hotspot subgraph, for example, the subgraph is a subgraph that includes celebrity information, it is likely that a large quantity of users access the subgraph at the same moment to query the celebrity information, and in this case, the subgraph may not support simultaneous scheduling by a plurality of tasks, and the algorithms cannot be executed in parallel, and this limits an overall speed of graph computing. In the foregoing implementation, the graph computing apparatus can monitor the quantity of times that each subgraph is requested. If the quantity of times that a specific subgraph is requested exceeds a threshold, it indicates that there are quite large requirements for the subgraph, and the subgraph is very likely to be a hotspot subgraph. In this case, the subgraph is triggered to be copied into a plurality of copies, and the plurality of copies are separately deployed on different computing units, and the subgraph is processed by the plurality of computing units, so that processing efficiency of the subgraph can be improved. In other words, concurrency is linearly extended by offloading concurrent computing requests to different instances for computing.

In some possible embodiments, in a process of executing the plurality of algorithms in parallel, write protection may be performed on a plurality of subgraphs. For example, a write protection manner includes but is not limited to any one of or a combination of a plurality of the following manner 1 to manner 3.

Manner 1 (locking): When any task in any algorithm is written to any subgraph, the computing unit may lock the subgraph, and during execution of the task, another task other than the task may not be written to the subgraph. After writing of the task in the algorithm to the subgraph ends, the computing unit may release the lock. Through execution of the manner 1, in one aspect, it can be ensured that write steps can be performed on subgraphs in serial, and in another aspect, implementation and management are relatively simple in this manner.

Manner 2 (multi-version concurrency control (MVCC)): The computing unit may cache all states of each of the plurality of subgraphs. For example, the computing unit may store a current state, a historical state, and a transitional state of the subgraph. Execution of the manner 2 helps perform write operations simultaneously.

Manner 3: For any subgraph in the plurality of subgraphs, a target instance may be selected from a plurality of instances of the subgraph, and the target instance may be considered as a preferred instance in the plurality of instances. When a write instruction for any instance of the subgraph is received, data may be first written to the target instance according to the write instruction, and when writing ends, data synchronization is performed between the target instance and another instance other than the target instance in the plurality of instances, to implement data consistency of all instances of the subgraph. Optionally, when a write instruction for any instance is received, a scatter task may be terminated, and can be resumed after write operations on all instances are completed, so that stricter consistency is implemented.

In the foregoing implementation, a probability of a data conflict caused when a plurality of tasks share the same subgraph can be reduced, and robustness of a system when distributed computing units execute a plurality of tasks in parallel can be ensured.

In some possible embodiments, the graph computing apparatus may create cache space for each task in each algorithm. When any intermediate result of the task is obtained, the graph computing apparatus may cache the intermediate result in the cache space, and may release the cache space after execution of the task ends.

According to the method provided this embodiment, a method that can support concurrent graph computing performed by using a plurality of algorithms is provided above. The plurality of subgraphs of the graph are loaded into the plurality of computing units, and the plurality of computing units executes the plurality of algorithms in parallel, so that the same graph can be shared by the plurality of algorithms, and the plurality of algorithms are executed in parallel on the same graph. In this way, a delay caused when one algorithm needs to executed after execution of another algorithm ends is saved, so that overall efficiency of performing graph computing by using the plurality of algorithms is improved, and overall time of performing graph computing by using the plurality of algorithms is shortened.

Figure 13:
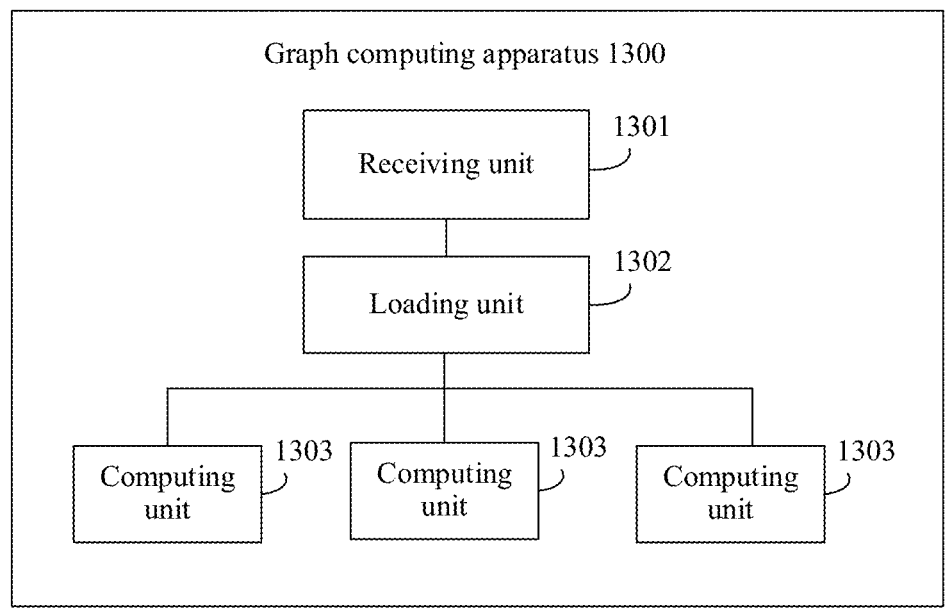
FIG. 13 is a schematic structural diagram of a graph computing apparatus according to this application.

This application further provides a graph computing apparatus 1300. As shown in FIG. 13, the graph computing apparatus 1300 includes a receiving unit 1301, a loading unit 1302, and a plurality of computing units 1303.

The receiving unit 1301 is configured to perform step 601. The loading unit 1302 is configured to perform step 602. The plurality of computing units 1303 are configured to perform step 603.

In a possible implementation, the plurality of computing units 1303 include: an obtaining module, configured to perform step 1 in step 603, for example, may be configured to execute any one of or a combination of a plurality of the manner 1 to the manner 9 in step 603, to divide an algorithm into a plurality of tasks; and an execution module, configured to perform step 2 in step 603.

In a possible implementation, the loading unit 1302 is configured to load a plurality of subgraphs in at least one modality to the plurality of computing units, and the execution module is configured to execute a task based on a subgraph in a target modality.

In a possible implementation, the execution module is configured to perform step A to step C in step 603.

In a possible implementation, the plurality of computing units 1303 are further configured to perform the steps other than a loading step in the algorithm.

In a possible implementation, the plurality of computing units 1303 are further configured to perform the steps other than a releasing step in the algorithm.

In a possible implementation, the apparatus further includes: a division unit, configured to divide a graph; and a storage unit, configured to save a plurality of subgraphs to a graph storage apparatus. The loading unit 1302 is configured to load the plurality of subgraphs of the graph from the graph storage apparatus to the plurality of computing units.

In a possible implementation, the division unit is configured to divide the graph based on the quantity of the plurality of computing units 1303.

In a possible implementation, the apparatus further includes a sending unit, configured to send a capacity expansion request, where the receiving unit is further configured to receive a capacity expansion indication; a creation unit, configured to create at least one computing unit; and a copying unit, configured to copy at least one subgraph of the graph. The loading unit 1302 is further configured to load an instance of the at least one subgraph into the created at least one computing unit. The created at least one computing unit is configured to execute a plurality of algorithms in parallel.

The graph computing apparatus 1300 may be provided for a user as a cloud computing service, for example, as a graph engine service. For example, as shown in FIG. 1, the graph computing apparatus 1300 (or a part of the graph computing apparatus 1300) is deployed in a cloud environment. After the user triggers a computing request by using a terminal, the graph computing apparatus 1300 is started to execute the plurality of algorithms on the graph, and a computing result may be provided for the user.

It should be noted that, when the graph computing apparatus provided in the embodiment of FIG. 13 performs graph computing, division of the foregoing units and modules is merely used as an example for description. In actual application, the foregoing functions may be allocated to different units and modules based on a requirement and completed by the different units and modules, to be specific, an internal structure of the graph computing apparatus is divided into different units and modules, to complete all or some of the functions described above. In addition, the graph computing apparatus provided in the foregoing embodiment belongs to the same concept as the embodiment of the graph computing method. For a specific implementation process of the graph computing apparatus, refer to the method embodiment. Details are not described herein again.

Figure 14:
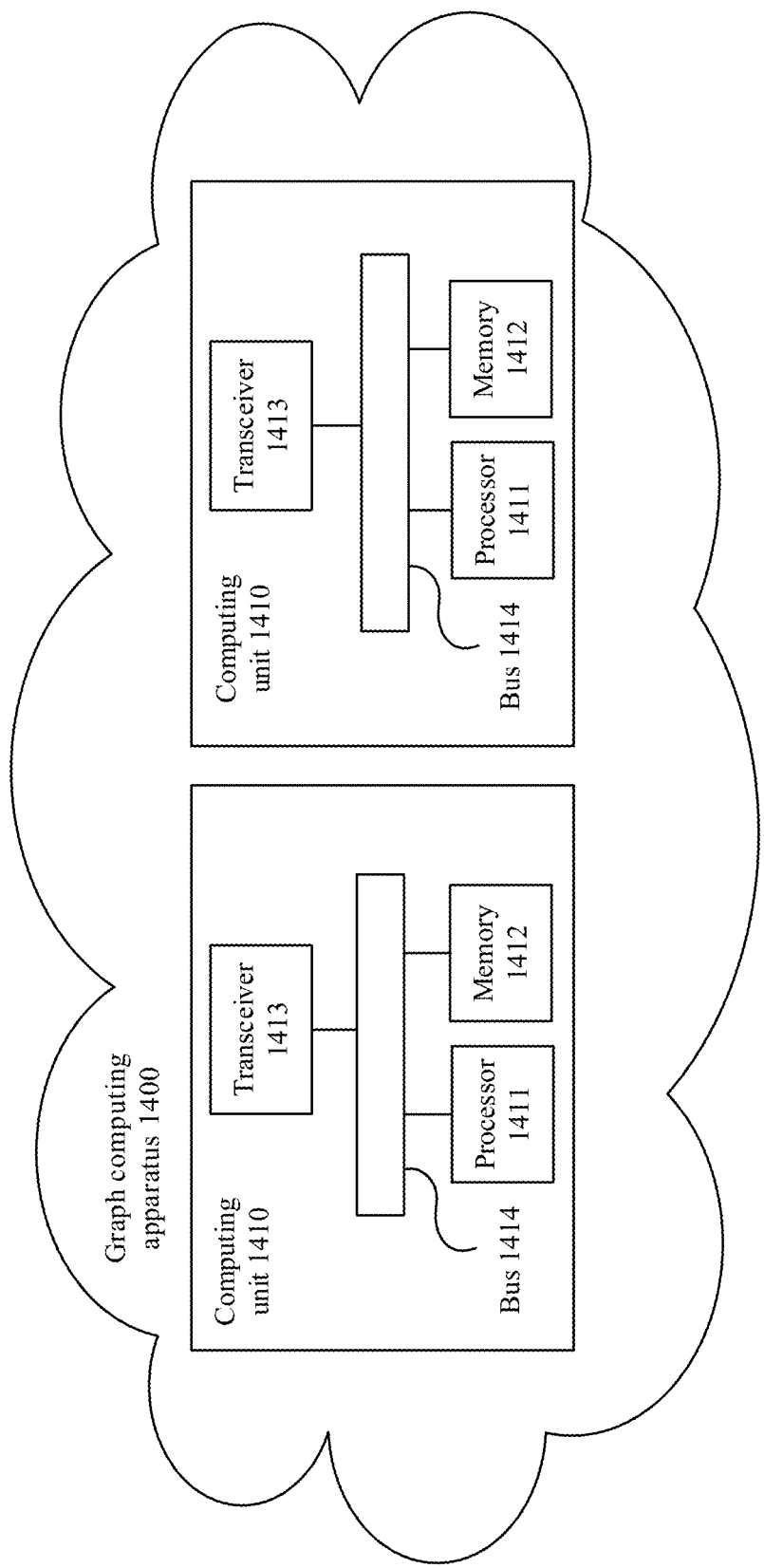
FIG. 14 is another schematic structural diagram of a graph computing apparatus according to this application.

This application further provides a graph computing apparatus 1400. As shown in FIG. 14, the graph computing apparatus 1400 includes a plurality of computing units 1410, and each computing unit 1410 includes a processor 1411, a memory 1412, a transceiver 1413, and a bus 1414. The processor 1411, the memory 1412, and the transceiver 1413 communicate with each other by using the bus 1414.

The processor may be a central processing unit (CPU). The memory may include a volatile memory such as a random access memory (RAM). The memory may further include a non-volatile memory such as a read-only memory (ROM), a flash memory, an HDD, or an SSD. The memory stores executable code, and the processor executes the executable code to perform the foregoing graph computing method. The memory may further include a software module required by another running process such as an operating system. The operating system may be LINUX™, UNIX™, WINDOWS™, or the like.

The memory 1412 in each computing unit 1410 of the graph computing apparatus 1400 stores code corresponding to each unit of the graph computing apparatus 1300. The processor 1411 executes the code to implement a function of each unit of the graph computing apparatus 1300, in other words, the processor 1411 performs the graph computing method provided in the embodiment of FIG. 6.

The graph computing apparatus 1400 may be deployed in a cloud environment. The plurality of computing units 1410 of the graph computing apparatus 1400 may form a distributed system, and different computing units 1410 may communicate with each other by using a wired or wireless network.

Figure 15:
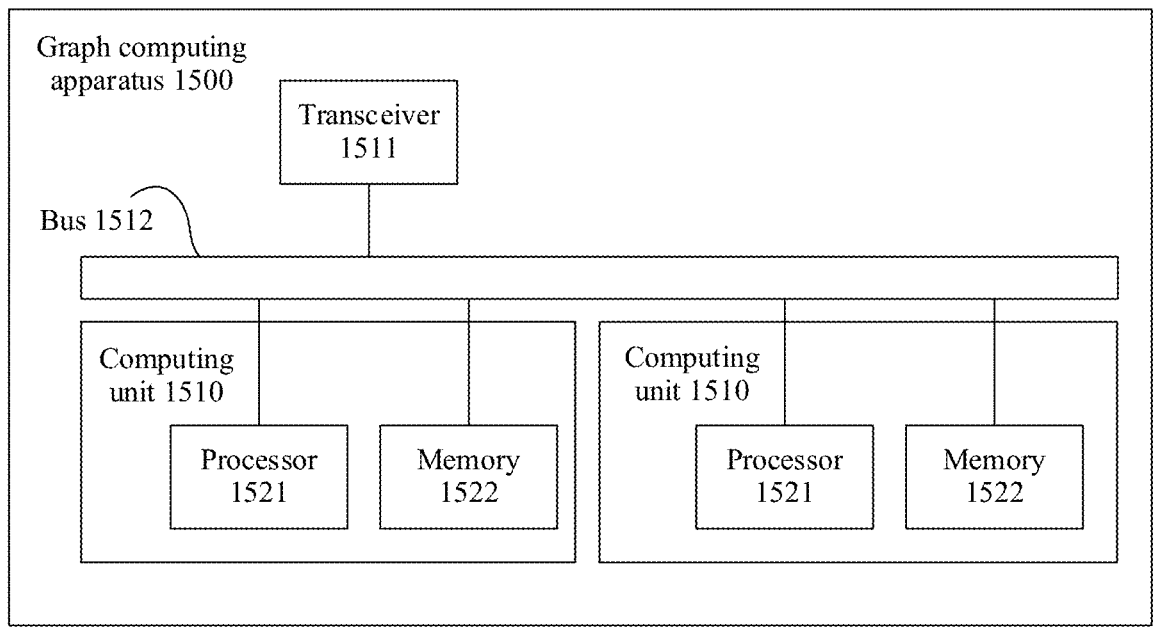
FIG. 15 is another schematic structural diagram of a graph computing apparatus according to this application.

This application further provides a graph computing apparatus 1500. As shown in FIG. 15, the graph computing apparatus 1500 includes a plurality of computing units 1510, a transceiver 1511, and a bus 1512.

Each computing unit 1510 includes a processor 1521 and a memory 1522. The processor 1521 may be similar to the processor 1411, and the memory 1522 may be similar to the memory 1412. Details are not described herein again.

The plurality of computing units 1510 of the graph computing apparatus 1500 may be deployed in a single machine, and different computing units 1510 may communicate with each other by using the bus 1512.

Figure 16:
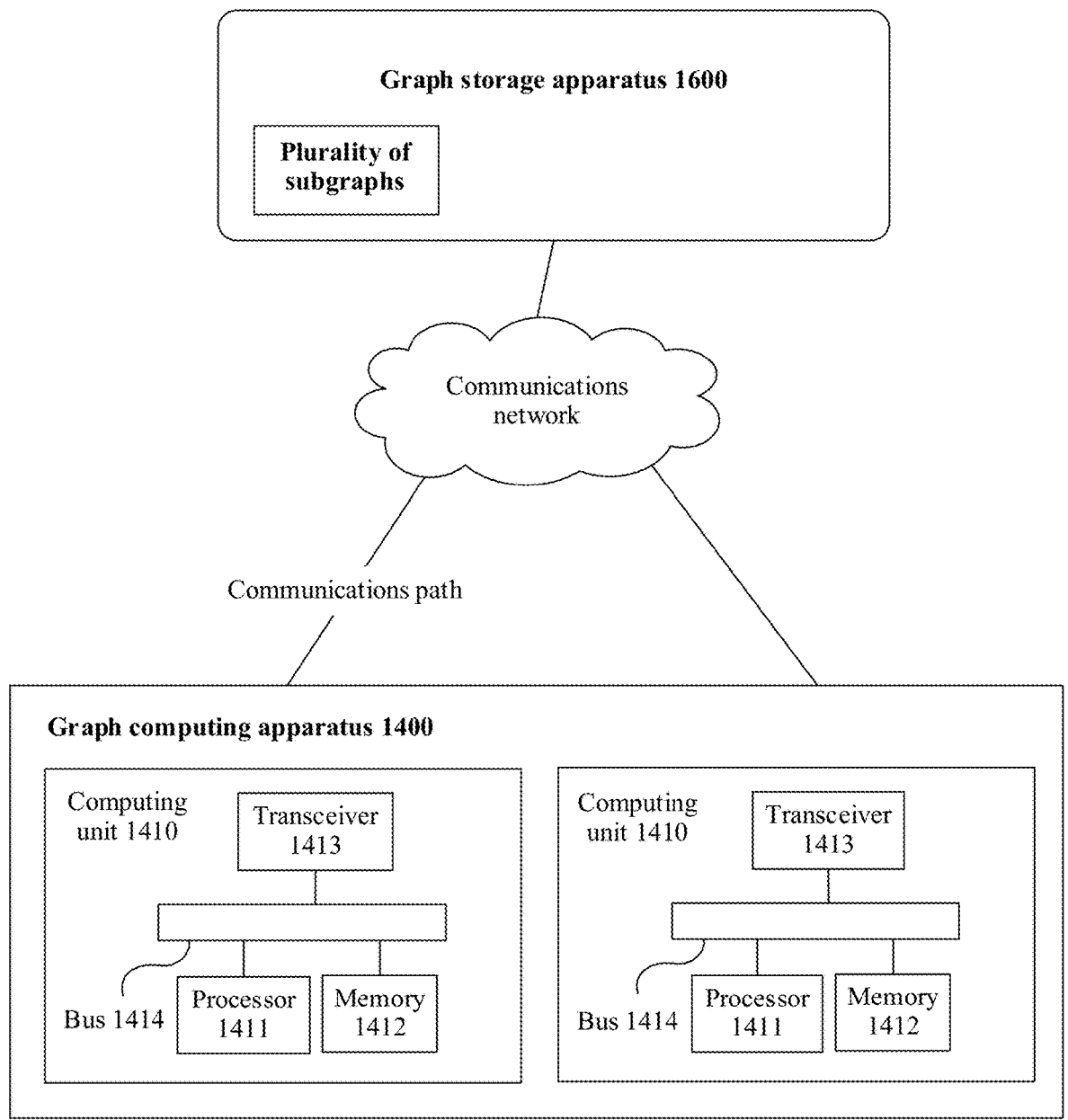
FIG. 16 is a schematic structural diagram of a graph computing system according to this application.

This application further provides a graph computing system. As shown in FIG. 16, the graph computing system further includes a graph storage apparatus 1600 in addition to the graph computing apparatus 1400 shown in the embodiment of FIG. 14. The graph storage apparatus 1600 is configured to store a plurality of subgraphs of a graph. In some possible embodiments, the graph storage apparatus 1600 may be provided for a user as a cloud storage service, and the user may apply for storage space of a specific capacity from the cloud storage service, and store the plurality of subgraphs of the graph in the storage space. During running, the graph computing apparatus 1400 loads a plurality of required subgraphs from the graph storage apparatus 1600 by using a communications network.

In a possible product form, the graph computing apparatus in this embodiment of this application may be implemented by a general-purpose processor. The general-purpose processor includes a processing circuit and an input interface that is in a communicative connection with an inner side of the processing circuit, and the input interface is configured to receive at least one computing request. The processing circuit is configured to perform the foregoing graph computing method. Optionally, the general-purpose processor may further include a storage medium, and the storage medium is configured to store an instruction to be executed by the processing circuit.

In a possible product form, the graph computing apparatus in this embodiment of this application may be alternatively implemented by using the following: one or more field programmable gate arrays (FPGA), a programmable logic device (PLD), a controller, a state machine, gate logic, a discrete hardware component, any other suitable circuit, or any combination of circuits that can execute various functions described in this application.

In some possible embodiments, this application further provides a computer program product. When the computer program product is executed by a graph computing apparatus, the graph computing apparatus performs the foregoing graph computing method. The computer program product may be a software installation package. When the foregoing graph computing method needs to be used, the computer program product may be downloaded and executed on the graph computing apparatus.

Descriptions of procedures corresponding to the foregoing accompanying drawings have respective focuses. For a part that is not described in detail in a procedure, refer to related descriptions of another procedure.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may include a personal computer, a server, or a network device) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer storage medium may be any usable medium accessible by a computer, or a data storage apparatus, for example, a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

It should be understood that the foregoing graph computing apparatuses in various product forms each have any function of the graph computing method in the foregoing method embodiment of FIG. 6, and details are not described herein again.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A graph computing method, wherein the method comprises:
   receiving at least one computing request to compute a graph by using a plurality of algorithms;
   loading a plurality of subgraphs of the graph that are in at least one modality into a plurality of computing units, wherein the at least one modality comprises an incoming edge modality or an outgoing edge modality, the incoming edge modality indicates an incoming edge relationship between a first vertex and a second vertex in the plurality of subgraphs, the first vertex is different from the second vertex, the outgoing edge modality indicates an outgoing edge relationship between a third vertex and a fourth vertex in the plurality of subgraphs, and the third vertex is different from the fourth vertex;
   obtaining at least one task in each algorithm of the plurality of algorithms, the at least one task comprising a gather task or a scatter task; and
   executing the gather task in at least a first algorithm and a second algorithm, of the plurality of algorithms, in parallel based on a first subgraph in the incoming edge modality, wherein the loaded plurality of subgraphs comprise the first subgraph; executing the scatter task in at least a third algorithm and a fourth algorithm, in the plurality of algorithms, in parallel on a second subgraph in the outgoing edge modality, wherein the loaded plurality of subgraphs comprise the second subgraph.

2. The method according to claim 1, wherein the obtaining the at least one task in each algorithm comprises at least one of the following:
   classifying at least one step corresponding to a same function name in the algorithm into a first task based on a function name corresponding to each step in the algorithm;
   classifying steps of a same execution body in the algorithm into a second task based on an execution body of each step in the algorithm;
   classifying steps with a same access sequence in the algorithm into a third task based on an access sequence for vertices or edges on the graph in each step in the algorithm;
   classifying steps, in the algorithm, in which a same vertex or a same edge is accessed into a fourth task based on a vertex or an edge that is on the graph and that is accessed in each step in the algorithm;

classifying steps of a same action in the algorithm into a fifth task based on an action executed in each step in the algorithm;

classifying steps that belong to a same iteration process in the algorithm into a sixth task based on an iteration process to which each step in the algorithm belongs; or classifying steps that belong to a same algorithm into a seventh task based on a determining branch to which each step in the determining branch in the algorithm belongs.

3. The method according to claim 1, wherein the method further comprises:

obtaining priorities of the plurality of algorithms based on quantities of iterations of the plurality of algorithms;

obtaining a scheduling scheme based on a priority of each algorithm, wherein the scheduling scheme is used to indicate a correspondence between at least one target task and at least one target subgraph, the target task is a task that is currently scheduled in the tasks in the plurality of algorithms, and the target subgraph is a subgraph that is currently scheduled in the plurality of subgraphs; and executing the at least one target task in parallel by using a second plurality of computing units into which the at least one target subgraph is loaded.

4. The method according to claim 1, wherein the method further comprises:

sending a capacity expansion request, wherein the capacity expansion request is used to request to expand capacities of the plurality of computing units;

receiving a capacity expansion indication, wherein the capacity expansion indication is used to indicate to expand the capacities of the plurality of computing units;

creating at least one additional computing unit;

copying a third subgraph of the plurality of subgraphs of the graph to obtain an instance of the third subgraph;

loading the instance of the third subgraph into the created at least one additional computing unit; and executing the plurality of algorithms in parallel by using the created at least one additional computing unit.

5. The method according to claim 4, wherein the copying at least the third subgraph of the plurality of subgraphs of the graph comprises:

counting a quantity of times that the third subgraph is requested by the plurality of algorithms; and copying the third subgraph based on the quantity of times that it is requested reaching a threshold.

6. The method of claim 4, wherein the first subgraph and the third subgraph are the same subgraph.

7. The method of claim 4, wherein the second subgraph and the third subgraph are the same subgraph.

8. The method of claim 2, wherein the first task is an apply task.

9. A graph computing apparatus, comprising a processor and a memory, wherein the memory stores at least one instruction that is loaded and executed by the processor to implement a method comprising:

receiving at least one computing request to compute a graph by using a plurality of algorithms;

loading a plurality of subgraphs of the graph that are in at least one modality into a plurality of computing units, wherein the at least one modality comprises an incoming edge modality or an outgoing edge modality, the incoming edge modality indicates an incoming edge relationship between a first vertex and a second vertex in the plurality of subgraphs, the first vertex is different from the second vertex, the outgoing edge modality indicates an outgoing edge relationship between a third vertex and a fourth vertex in the plurality of subgraphs, and the third vertex is different from the fourth vertex;

obtaining at least one task in each algorithm of the plurality of algorithms, the at least one task comprising a gather task or a scatter task; and executing the gather task in at least a first algorithm and a second algorithm, of the plurality of algorithms, in parallel on a first subgraph in the incoming edge modality, wherein the loaded plurality of subgraphs comprise the first subgraph; executing the scatter task in at least a third algorithm and a fourth algorithm, in the plurality of algorithms, in parallel based on a second subgraph in the outgoing edge modality, wherein the loaded plurality of subgraphs comprise the second subgraph, by using the plurality of computing units.

10. The apparatus according to claim 9, wherein the obtaining the at least one task in each algorithm comprises at least one of the following:

classifying at least one step corresponding to a same function name in the algorithm into a first task based on a function name corresponding to each step in the algorithm;

classifying steps of a same execution body in the algorithm into a second task based on an execution body of each step in the algorithm;

classifying steps with a same access sequence in the algorithm into a third task based on an access sequence for vertices or edges on the graph in each step in the algorithm;

classifying steps, in the algorithm, in which a same vertex or a same edge is accessed into a fourth task based on a vertex or an edge that is on the graph and that is accessed in each step in the algorithm;

classifying steps of a same action in the algorithm into a fifth task based on an action executed in each step in the algorithm;

classifying steps that belong to a same iteration process in the algorithm into a sixth task based on an iteration process to which each step in the algorithm belongs; or classifying steps that belong to a same algorithm into a seventh task based on a determining branch to which each step in the determining branch in the algorithm belongs.

11. The apparatus according to claim 9, wherein the method further comprises:

obtaining priorities of the plurality of algorithms based on quantities of iterations of the plurality of algorithms;

obtaining a scheduling scheme based on a priority of each algorithm, wherein the scheduling scheme is used to indicate a correspondence between at least one target task and at least one target subgraph, the target task is a task that is currently scheduled in the tasks in the plurality of algorithms, and the target subgraph is a subgraph that is currently scheduled in the plurality of subgraphs; and executing the at least one target task in parallel by using a second plurality of computing units into which the at least one target subgraph is loaded.

12. A non-transitory computer-readable storage medium storing instructions which when executed cause performance of operations comprising:

receiving at least one computing request to compute a graph by using a plurality of algorithms;

loading a plurality of subgraphs of the graph that are in at least one modality into a plurality of computing units, wherein the at least one modality comprises an incoming edge modality or an outgoing edge modality, the incoming edge modality indicates an incoming edge relationship between a first vertex and a second vertex of the plurality of subgraphs, the first vertex is different from the second vertex, the outgoing edge modality indicates an outgoing edge relationship between a third vertex and a fourth vertex of the plurality of subgraphs, and the third vertex is different from the fourth vertex;

obtaining at least one task in each algorithm of the plurality of algorithms, the at least one task comprising a gather task or a scatter task; and executing the gather task in at least a first algorithm and a second algorithm, of the plurality of algorithms, in parallel a first subgraph in the incoming edge modality, wherein the loaded plurality of subgraphs comprise the first subgraph; executing the scatter task in at least a third algorithm and a fourth algorithm, in the plurality of algorithms, in parallel based on a second subgraph in the outgoing edge modality, wherein the loaded plurality of subgraphs comprise the second subgraph, by using the plurality of computing units.

13. The non-transitory computer-readable storage medium according to claim 12, wherein the obtaining tasks in the plurality of algorithms comprises at least one of the following:

classifying at least one step corresponding to a same function name in the algorithm into a first task based on a function name corresponding to each step in the algorithm;

classifying steps of a same execution body in the algorithm into a second task based on an execution body of each step in the algorithm;

classifying steps with a same access sequence in the algorithm into a third task based on an access sequence for vertices or edges on the graph in each step in the algorithm;

classifying steps, in the algorithm, in which a same vertex or a same edge is accessed into a fourth task based on a vertex or an edge that is on the graph and that is accessed in each step in the algorithm;

classifying steps of a same action in the algorithm into a fifth task based on an action executed in each step in the algorithm;

classifying steps that belong to a same iteration process in the algorithm into a sixth task based on an iteration process to which each step in the algorithm belongs; or classifying steps that belong to a same algorithm into a seventh task based on a determining branch to which each step in the determining branch in the algorithm belongs.

14. The non-transitory computer-readable storage medium of claim 12, wherein the method further comprises:

obtaining priorities of the plurality of algorithms based on quantities of iterations of the plurality of algorithms;

obtaining a scheduling scheme based on a priority of each algorithm, wherein the scheduling scheme is used to indicate a correspondence between at least one target task and at least one target subgraph, the target task is a task that is currently scheduled in the tasks in the plurality of algorithms, and the target subgraph is a subgraph that is currently scheduled in the plurality of subgraphs; and executing the at least one target task in parallel by using a second plurality of computing units into which the at least one target subgraph is loaded.

15. The non-transitory computer-readable storage medium according to claim 12, wherein the method further comprises:

sending a capacity expansion request, wherein the capacity expansion request is used to request to expand capacities of the plurality of computing units;

receiving a capacity expansion indication, wherein the capacity expansion indication is used to indicate to expand the capacities of the plurality of computing units;

creating at least one additional computing unit;

copying a third subgraph of the plurality of subgraphs of the graph to obtain an instance of the third subgraph;

loading the instance of the third subgraph into the created at least one additional computing unit; and executing the plurality of algorithms in parallel by using the created at least one additional computing unit.

16. The non-transitory computer-readable storage medium according to claim 15, wherein the copying at least the third subgraph of the graph comprises:

counting a quantity of times that the third subgraph is requested by the plurality of algorithms; and copying the third subgraph based on the quantity of times that it is requested reaching a threshold.

17. The non-transitory computer-readable storage medium according to claim 15, wherein the first subgraph and the third subgraph are the same subgraph.

18. The non-transitory computer-readable storage medium according to claim 15, wherein the second subgraph and the third subgraph are the same subgraph.

19. The non-transitory computer-readable storage medium according to claim 13, wherein the first task and the second task are the same task.

20. The non-transitory computer-readable storage medium according to claim 12, wherein the at least one task further comprises an apply task.

* * * * *

UNITED STATES PATENT AND TRADEMARK OFFICE
CERTIFICATE OF CORRECTION

Page 1 of 1

PATENT NO. : 12,411,708 B2
APPLICATION NO. : 17/508294
DATED : September 9, 2025
INVENTOR(S) : Yinglong Xia et al.

It is certified that error appears in the above-identified patent and that said Letters Patent is hereby corrected as shown below:

In the Claims

In Column 42, Claim 1, Line 44, delete "parallel based on" and insert -- parallel on --, therefor.

In Column 45, Claim 12, Line 18, delete "parallel a first" and insert -- parallel on a first --, therefor.

Signed and Sealed this
Twenty-third Day of December, 2025

John A. Squires
*Director of the United States Patent and Trademark Office*